(12) United States Patent
Ikeda et al.

(10) Patent No.: US 7,073,153 B2
(45) Date of Patent: Jul. 4, 2006

(54) ROUTE SEARCHING METHOD AND STORAGE MEDIUM THEREOF

(75) Inventors: Hiroshi Ikeda, Kawasaki (JP); Naomi Bizen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 09/982,840

(22) Filed: Oct. 22, 2001

(65) Prior Publication Data

US 2002/0161947 A1 Oct. 31, 2002

(30) Foreign Application Priority Data

Apr. 26, 2001 (JP) .............................. 2001-128969

(51) Int. Cl.
*G06F 17/50* (2006.01)
(52) U.S. Cl. .............................. 716/13; 716/12; 716/14
(58) Field of Classification Search ................. 716/12, 716/13, 14
See application file for complete search history.

(56) References Cited

U.S. PATENT DOCUMENTS

| | | | | |
|---|---|---|---|---|
| 5,245,550 A * | 9/1993 | Miki et al. | .................... | 716/13 |
| 5,375,069 A * | 12/1994 | Satoh et al. | ................... | 716/14 |
| 5,550,748 A * | 8/1996 | Xiong | ........................... | 716/13 |
| 5,784,600 A * | 7/1998 | Doreswamy et al. | ....... | 713/503 |
| 6,259,673 B1 * | 7/2001 | Yoshihara et al. | .......... | 370/238 |
| 6,266,802 B1 * | 7/2001 | Malm et al. | ................... | 716/12 |
| 6,308,306 B1 * | 10/2001 | Kaneko | ......................... | 716/6 |
| 6,336,205 B1 * | 1/2002 | Kurokawa et al. | ............. | 716/2 |
| 6,401,234 B1 * | 6/2002 | Alpert et al. | .................. | 716/13 |
| 6,560,763 B1 * | 5/2003 | Sugiyama et al. | ............ | 716/13 |
| 6,609,237 B1 * | 8/2003 | Hamawaki et al. | ........... | 716/10 |
| 2003/0121018 A1 * | 6/2003 | Leung et al. | .................. | 716/12 |

* cited by examiner

*Primary Examiner*—Stacy A. Whitmore
*Assistant Examiner*—Magid Y. Dimyan
(74) *Attorney, Agent, or Firm*—Staas & Halsey LLP

(57) ABSTRACT

A route of a signal from a starting point pin to an end point pin is searched for in an electronic circuit designed by combining cells which are basic devices entered for use in a designing process. At this time, one or more conditions satisfied by a route to be distinguished from other routes from the starting point pin to the end point pin are set. A route can be distinguished from others depending on whether or not the route satisfies the set condition, and a search for a route from the starting point pin to the end point pin is carried out on each route to be distinguished from others by a condition.

28 Claims, 37 Drawing Sheets

| EVENT | PREVIOUS STAGE | ROUTE IDENTIFICATION CODE |
|---|---|---|
| A | NONE | 0 |
| B | A | 0 |
| C | A | 0 |
| D | B | 1 |
| E | C | 0 |
| F | C | 0 |
| G1 | D | 2 |
| G2 | E | 0 |
| H | F | 0 |
| I1 | G1 | 3 |
| I2 | G2 | 4 |
| I3 | H | 0 |
| J1 | D | 5 |
| J2 | I1 | 3 |
| J3 | I2 | 4 |
| J4 | I3 | 0 |

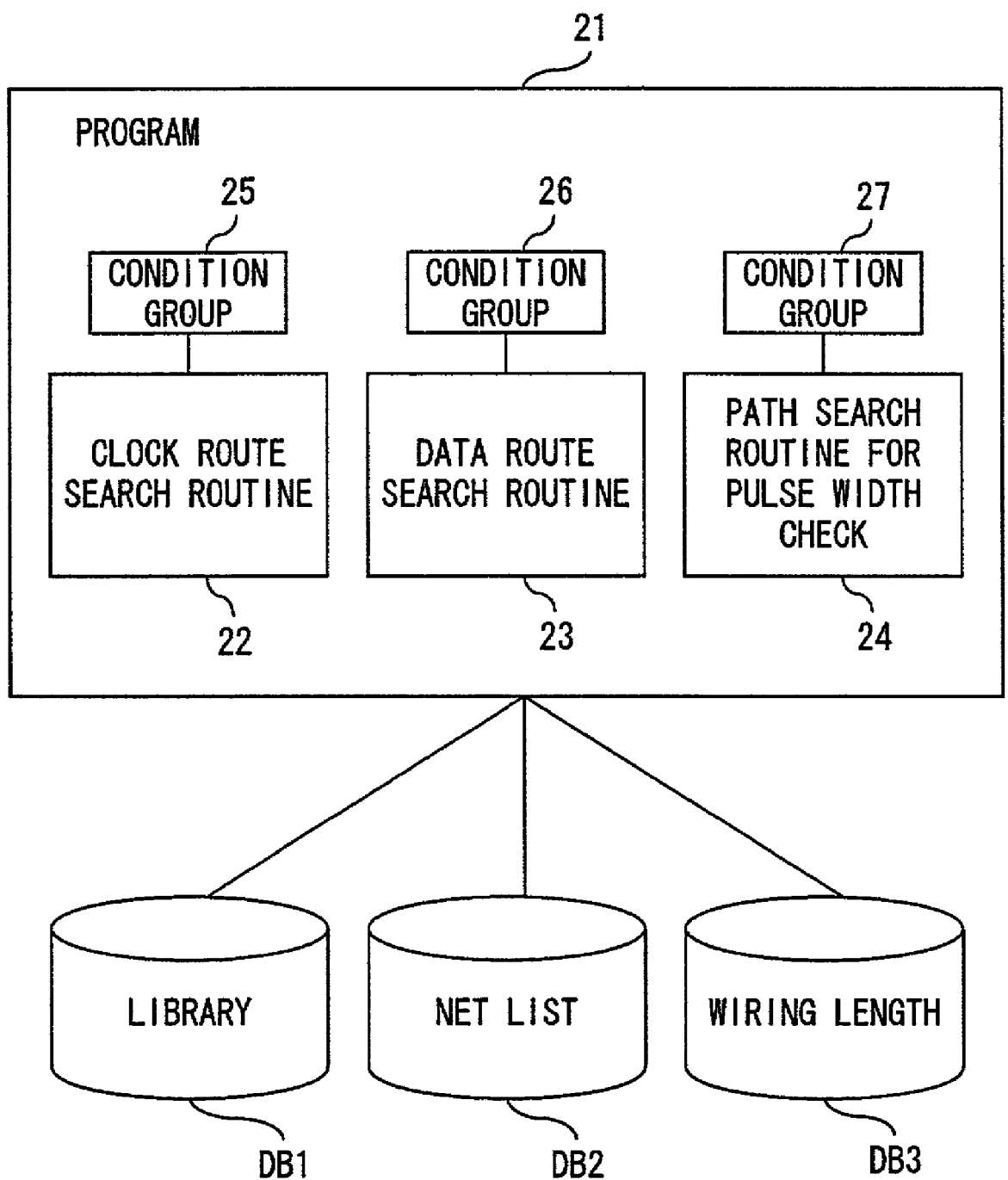
F I G. 3

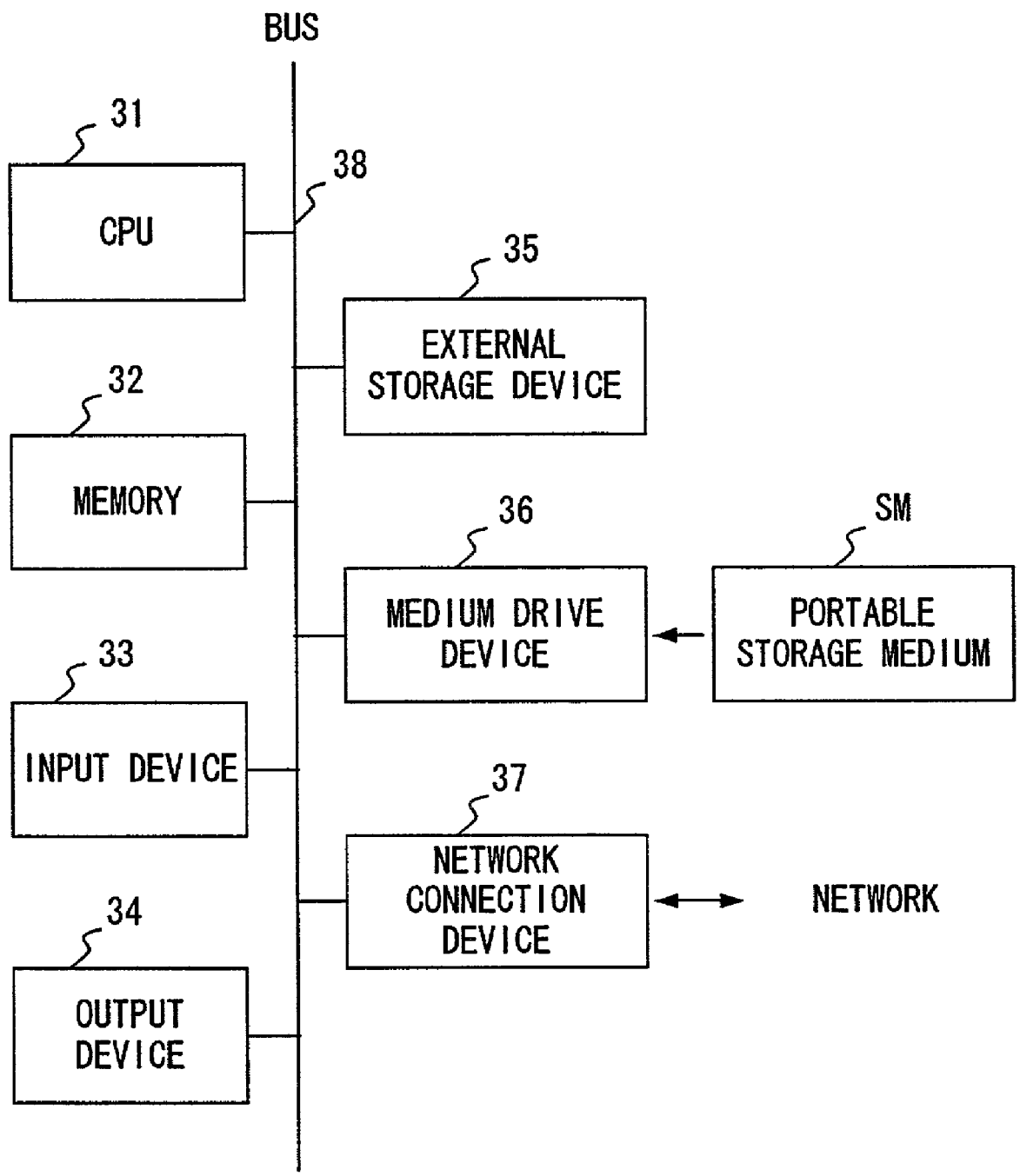
F I G. 4

| EVENT | EVENT AT PREVIOUS STAGE | ROUTE IDENTIFICATION CODE |
|---|---|---|
| A |  | 0 |
| B | A | 0 |
| C | A | 0 |

| EVENT | EVENT AT PREVIOUS STAGE | ROUTE IDENTIFICATION CODE |
|---|---|---|
| A | NONE | 0 |
| B | A | 0 |
| C | A | 0 |
| D | B | 1 |
| E | C | 0 |
| F | C | 0 |

| EVENT | PREVIOUS STAGE | ROUTE IDENTIFICATION CODE |
|---|---|---|
| A | NONE | 0 |
| B | A | 0 |
| C | A | 0 |
| D | B | 1 |
| E | C | 0 |
| F | C | 0 |
| G1 | D | 2 |
| G2 | E | 0 |
| H | F | 0 |

| EVENT | PREVIOUS STAGE | ROUTE IDENTIFICATION CODE |
|---|---|---|
| A | NONE | 0 |
| B | A | 0 |
| C | A | 0 |
| D | B | 1 |
| E | C | 0 |
| F | C | 0 |
| G1 | D | 2 |
| G2 | E | 0 |
| H | F | 0 |
| I1 | G1 | 3 |
| I2 | G2 | 4 |
| I3 | H | 0 |
| J1 | D | 5 |
| J2 | I1 | 3 |
| J3 | I2 | 4 |
| J4 | I3 | 0 |

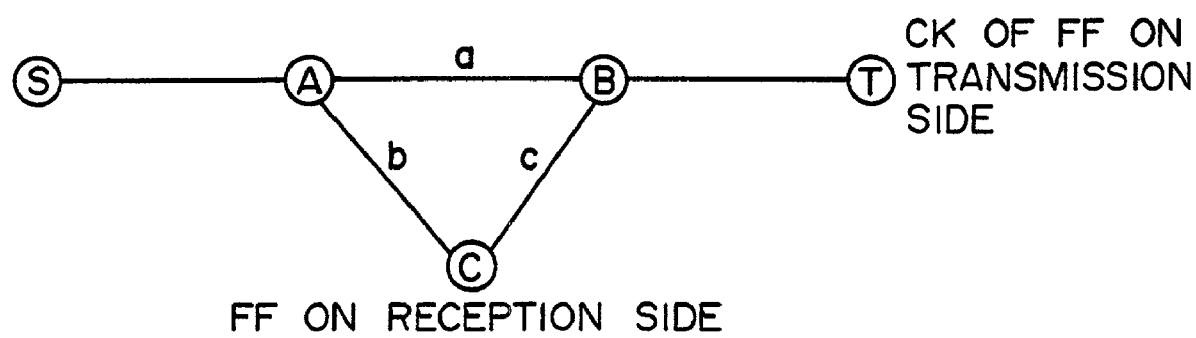
F I G. 14

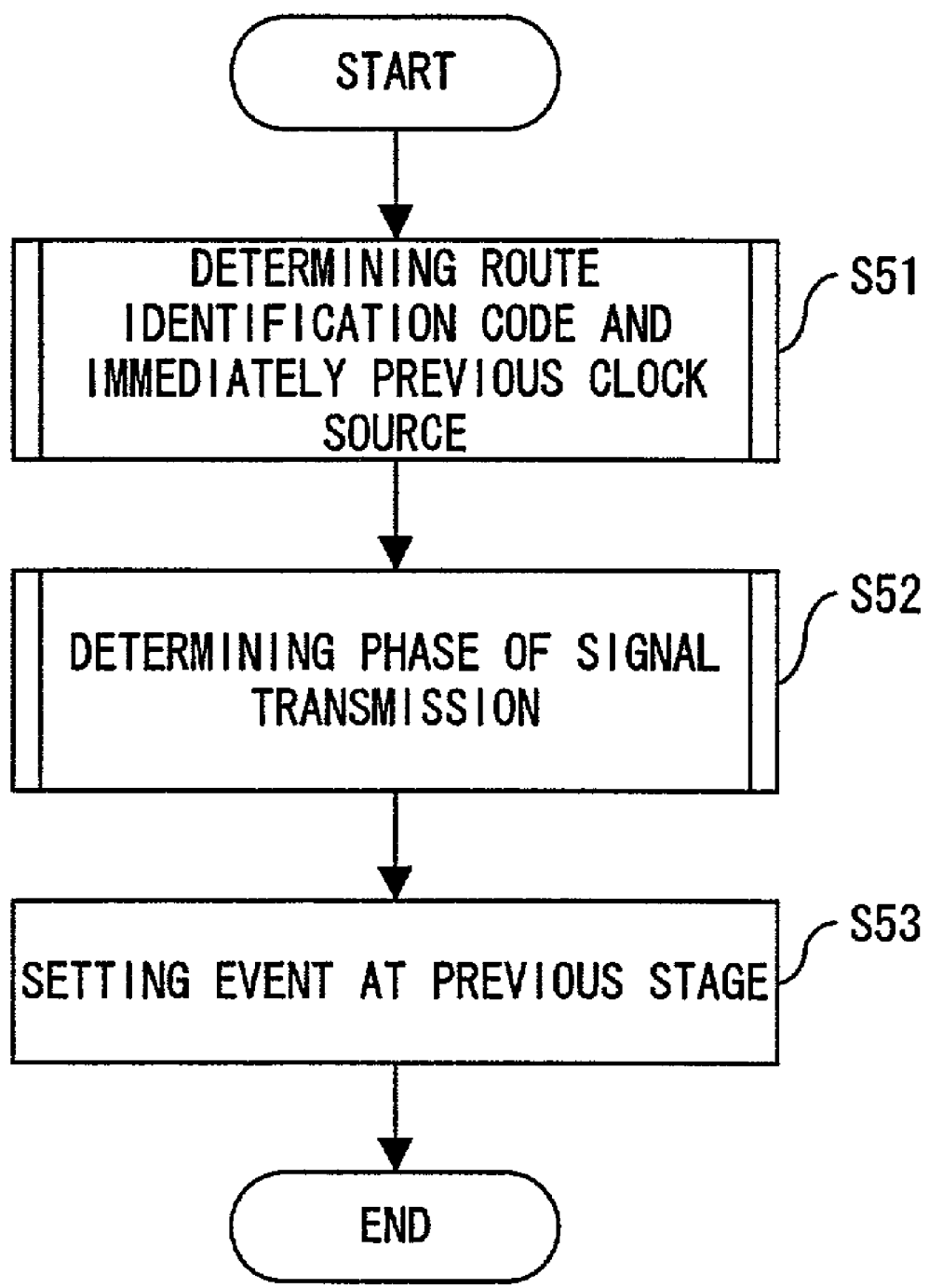
F I G. 2 6

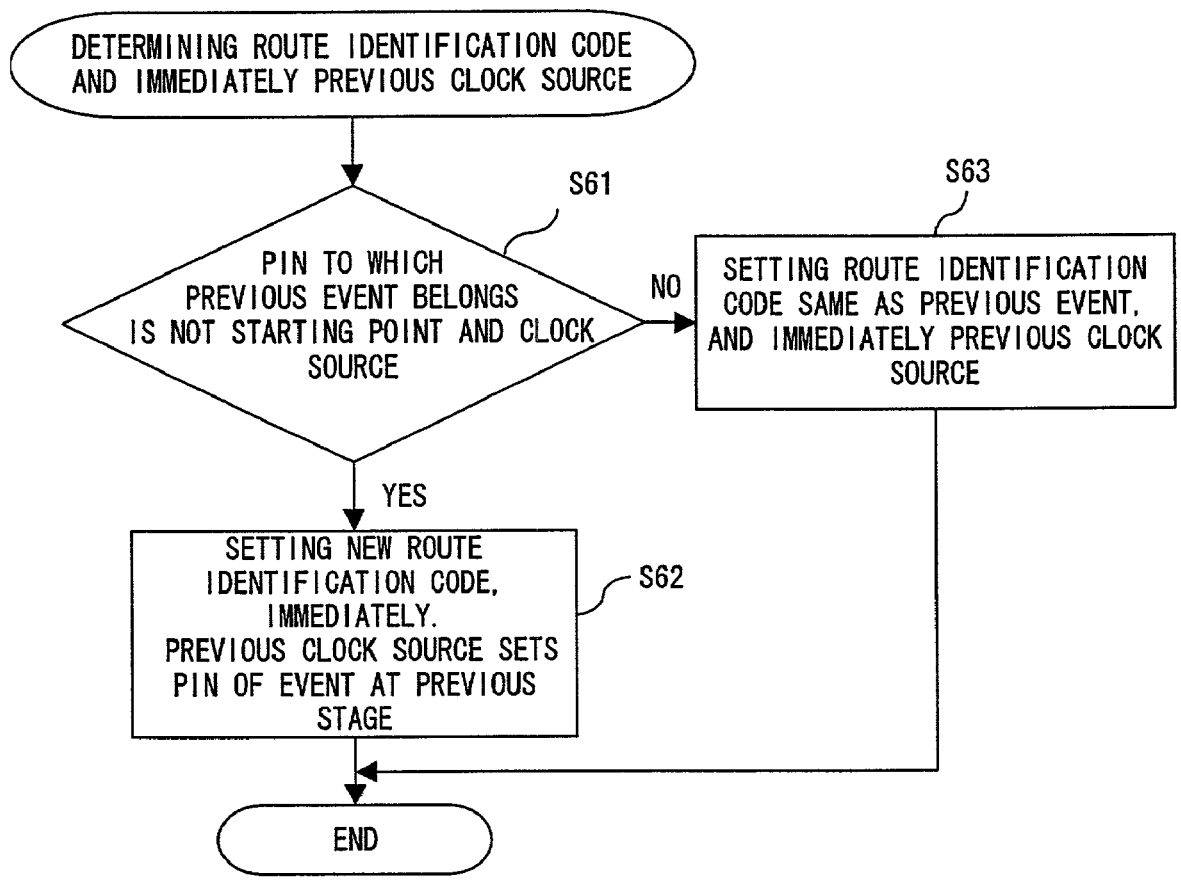
F I G. 2 7

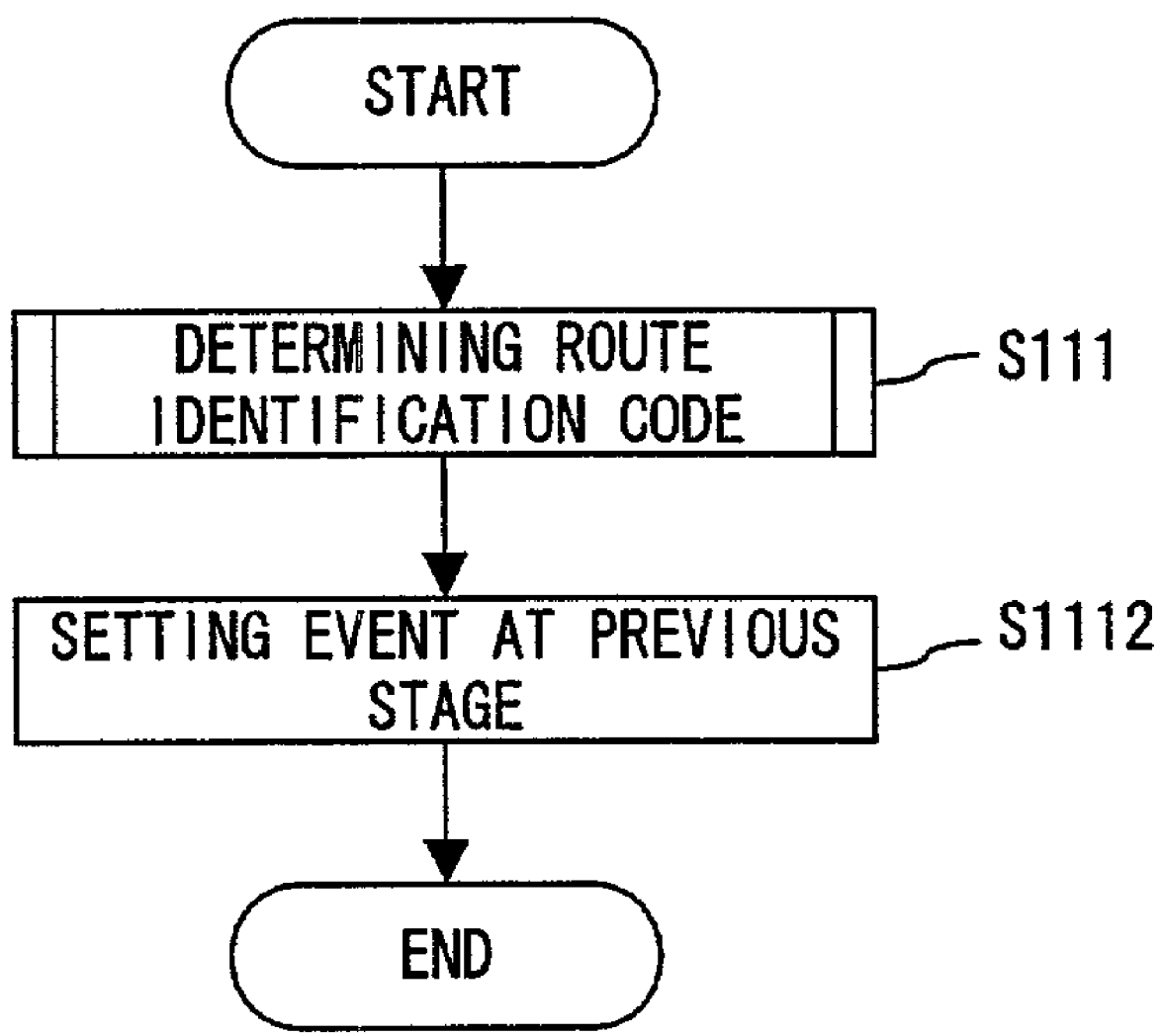
F I G. 3 2

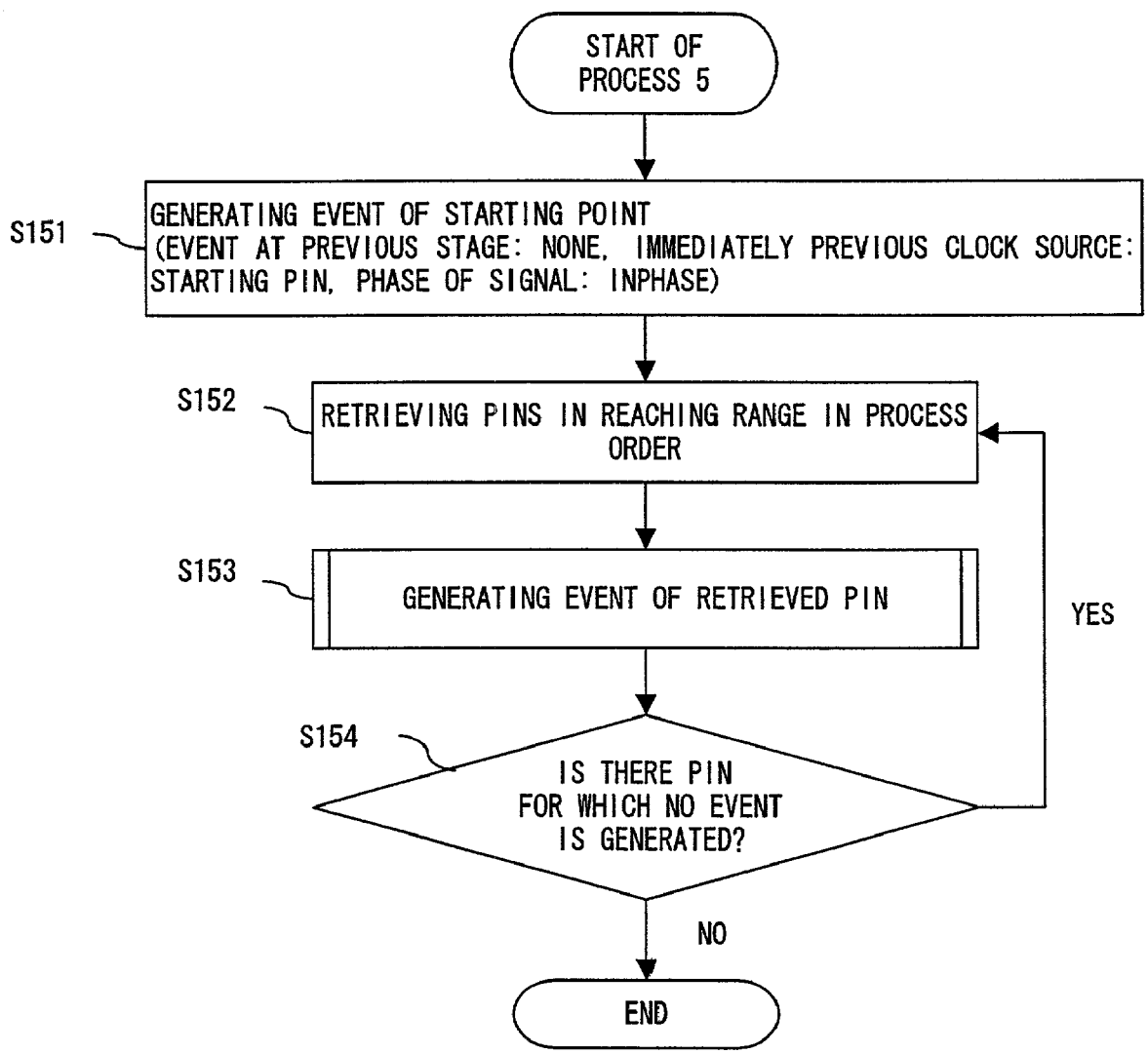
F I G. 3 6

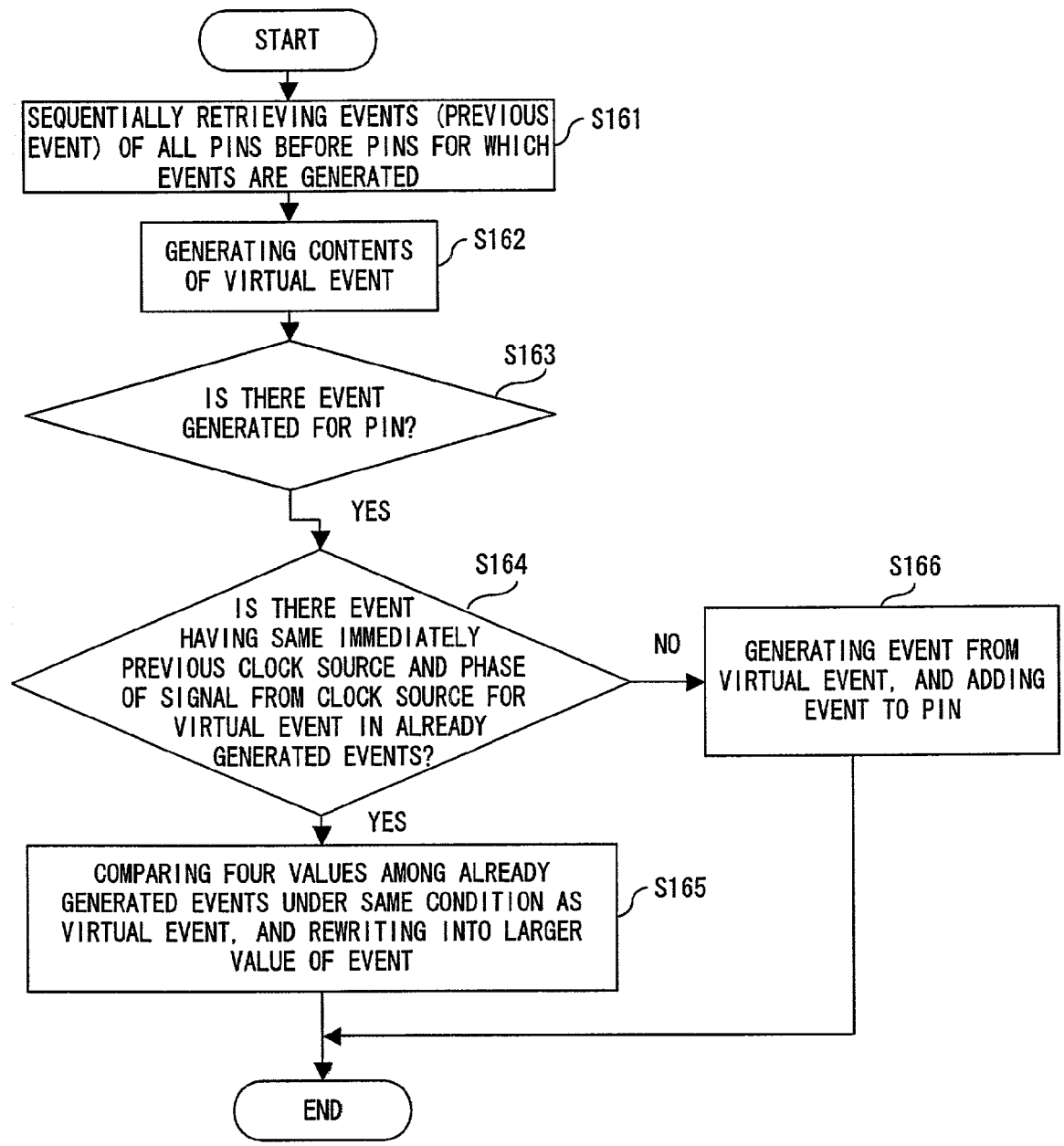
F I G. 3 7

ROUTE SEARCHING METHOD AND STORAGE MEDIUM THEREOF

BACKGROUND OF THE INVENTION

1. Field of the Invention

The present invention relates to the technology of simulating (timing analysis, waveform analysis, etc.) the verification of an operation of an electronic circuit designed by combining cells entered in advance.

2. Description of the Related Art

Recently, since there has been a strong demand to develop an electronic circuit such as a printed circuit board (PCB), an integrated circuit, etc. at a lower cost in a shorter period, the significance of the CAD (computer aided design) technology for supporting the development has been evaluated much more.

In an electronic CAD system, standardization and modeling are specifically required to design various systems without much technical knowledge. The devices or parts of the functional or logical unit of an electronic circuit, etc. are entered in the library from flip-flop (hereinafter referred to as an FF), shift register, etc. a basic gate such as a NAND, NOR, etc., and a CPU, memory, etc. are entered in the library as basic elements (cells). Therefore, the logical design can be basically set by selecting a necessary cell in the cells entered in the library, and connecting the selected cells. The cells can be connected by connecting their pins.

The result of logical design is converted into a net list (logical circuit data). The net list is described as the mutual connection of cells entered in the library. The layout design and simulation are performed using the net list.

As an analysis in the simulation, a timing analysis is done to confirm whether or not an error (malfunction, etc.) occurs by the time difference in transmitting a signal. As a timing analysis, a setup time check for confirming whether or not a timing of fetching data is too late in an FF, etc., a hold time check for confirming whether or not a timing of fetching the data is too early, etc. are carried out. Additionally, a pulse width check for confirming whether or not the waveform of a transmitted clock signal maintains the form guaranteeing the operation, etc. is carried out as a waveform analysis.

FIGS. 1A and 1B show the above mentioned timing analyses. FIG. 1A shows an example of a target circuit, and FIG. 1B is a timing chart of the operation. In these figures, it is assumed that an assignment delay model in which a characteristic delay time is assigned to each cell is adopted. As it is well-known, there also is an uncertain delay model (maximum-minimum delay model) in which a delay time has margin.

In the circuit shown in FIG. 1A, FF1 and 2 correspond to cells, and CK, DT, and Q terminals correspond to the pins of the respective cells. The pin 3 indicated by a circle inputs a clock signal, or outputs a generated clock signal (clock source). The point at which the line connected to the CK terminal of the FF1 crosses the line connecting the clock source 3 to the CK terminal of the FF2 is also processed as a pin. Tcs indicates the delay time required for the clock signal output from the clock source 3 to be input into the CK terminal of the FF1, Tct indicates the delay time required for the clock signal output from the clock source 3 to be input into the CK terminal of the FF2, and Td indicates the delay time required from the rise (rise edge) of the clock signal input into the CK terminal of the FF1 to the input of the output signal (data signal) of the Q terminal of the FF1 changing by the rise of the clock signal into the DT terminal of the FF2.

In FIG. 1B, 'CLOCK' indicates the clock signal output from the clock source 3. 'FF1, CK' indicates the clock signal input into the CK terminal of the FF1. 'FF2, DT' indicates the data signal input into the DT terminal of the FF2. "FF2, CK" indicates the clock signal input into the CK terminal of the FF2.

The communications of the data signal between the FF1 and FF2 operated according to the clock signal have to be synchronized with the clock signal. The problems that the data signal cannot be transmitted or received, or that the clock signal is out of cycle have to be avoided. To attain this, in the FF2, the timing of changing the data signal input into the DT terminal should not be too early, and should not be too late relative to the timing of the rise of the clock signal input into the CK terminal. That is, the difference of the timings of the clock signal and the data signal is to be in an allowable range. The setup time check (over-delay check) is carried out to confirm whether or not the timing of changing the data signal is too late, and the other hold time check (racing check) is carried out to confirm whether or not the timing of changing the data signal too early.

In FIG. 1B, Tsetup and Thold indicate the time set to confirm the timing with a certain allowance. In the equations shown in FIG. 1B, $Tcs+Td-Tct+Tsetup \leq \tau$ ($\tau$ is a time set for checking a setup time based on the cycle of the clock signal) indicates the relationship in which the result of the setup time check is OK, and $Tcs+Td-Tct+Thold \geq 0$ indicates the relationship in which the result of the hold time check is OK. Ts shown in FIG. 1B indicates the skew (time lag) of the clock signal between the FF1 and FF2.

The search for the route used in the above mentioned timing analysis is carried out for each analysis or type of signal. In the route (data route) through which a data signal is carried, a route is searched for chiefly based on the delay time in the entire route by, for example, a route in which the delay time required to transmit a signal is the longest (or shortest) from among the routes of signals from the starting pin to the end pin. However, in the cells entered in the library, there are some cells (for example, selectors) which output signals depending on the situation. Therefore, in such a searching process, there can be the problem that a route which is not to be used in a timing analysis is extracted. Thus, a timing analysis cannot always be done with high precision.

On the other hand, a search for a route (clock route) through which a clock signal is transmitted has been conventionally carried out as in the search for a route through which a data signal is transmitted. However, in a setup time check or a hold time check, for example, a frequency divider for dividing the frequency of a clock signal is used for a circuit, and the combination of a clock route with a data route indicating the largest (or smallest) difference in delay time is the worst example in timing. Accordingly, there has been the problem that a clock route indicating the worst check result cannot be extracted, thereby reducing the precision in a timing analysis. This holds true with a waveform analysis.

As described above, when a timing analysis, etc. is performed with high precision, it is necessary to take all clock routes into account. However, in the current circuit design, it is normal that there are a large number of pins for branch or merge of clock signals. In such a branching or a merging operation, the route obviously increases like an exponential function, and the number of the routes becomes enormously large. Therefore, doing a timing analysis on all clock routes is not a practical method in the viewpoints of memory capacity required for a process, a processing time, etc. Thus, considering all clock routes, it is necessary to reduce the requirements for a memory capacity or shorten a processing time for a process.

SUMMARY OF THE INVENTION

The present invention aims at providing the technology of simulating the verification of an operation of a designed electronic circuit constantly with high precision.

The present invention also aims at providing the technology of simulating the verification of an operation of an electronic circuit constantly with high precision with the requirements for the memory capacity and the processing time successfully reduced.

The route searching method according to the present invention is used to search for a route of a signal from a starting pin to an end pin in an electronic circuit designed by combining cells which are basic elements entered in advance for a designing process.

According to the first aspect of the route searching method, one or more conditions satisfied by a route to be distinguished from other routes from the starting pin to the end pin are set, and determination is made as to whether or not the set conditions are satisfied to search for a route from the starting pin to the end pin for each route distinguished from others by the conditions.

By distinguishing a route based on whether or not the set conditions are satisfied, a route can be extracted for each route to be distinguished from others by satisfied conditions. Thus, the number of extracted routes can be reduced with necessary routes set aside.

According to the second aspect of the route searching method, when there are two or more routes having the same junction pins, one or more conditions to be satisfied among the two or more routes in selecting one of the two or more routes are set, one of the two or more routes satisfying the set conditions is selected and set aside, and the routes from the starting pin to the end pin is searched for.

According to the third aspect of the route searching method, when there are two or more routes having the same junction pin, one or more conditions to be satisfied among the two or more routes in synthesizing the two or more routes are set, the two or more routes satisfying the set conditions are put into one route, and the routes from the starting pin to the end pin is searched for.

In the above mentioned second and third aspect of the route searching method, the routes whose analysis results can the worst are set aside, and the number of extracted routes can be reduced.

According to the timing analyzing method, the waveform analyzing method, and the electronic circuit simulation apparatus, a route searched for and extracted using at least one of the route searching method according to the first through third aspects is used in an analysis (simulation). As a result of the analysis using the above mentioned route, the processing time can be shortened, and the requirements for the memory capacity for the process can be reduced without lowering the precision of the analysis result. As it is obvious as described above, the present invention is very effective in supporting the design of a electronic circuit which has been realized in a large scale, and whose routes have been more and more complicated these days.

BRIEF DESCRIPTION OF THE DRAWINGS

FIG. 3 shows the configuration of the program executed by the route search device mounted in the electronic circuit simulation device according to the first embodiment of the present invention;

FIG. 4 shows the configuration of the CAD apparatus in which the electronic circuit simulation apparatus according to the second embodiment of the present invention is mounted;

FIG. 14 shows the principle of the method of searching a route through which a clock signal is transmitted (2);

FIG. 26 is a flowchart of the contents generating process of a virtual event;

FIG. 27 is a flowchart of the process of determining a route identification code, and a clock source immediately before;

FIG. 32 is a flowchart of the contents generating process for a virtual event in step S102;

FIG. 36 is a flowchart of the process 5; and

FIG. 37 is a flowchart of the pin event generating process in the process 5.

DESCRIPTION OF THE PREFERRED EMBODIMENTS

The embodiments of the present invention are described below in detail by referring to the attached drawings.

First Embodiment

Figure 2:
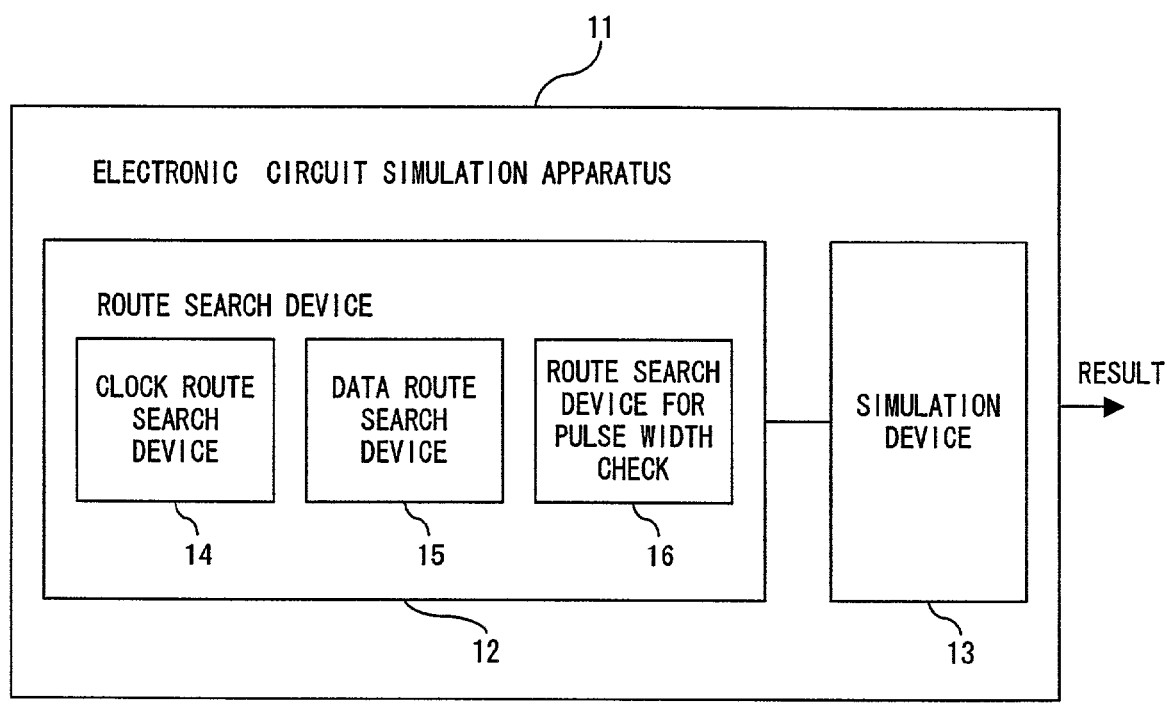
FIG. 2 shows the configuration of the electronic circuit simulation apparatus according to the first embodiment of the present invention.

FIG. 2 shows the configuration of the electronic circuit simulation apparatus according to the first embodiment. The configuration and the operation of an electronic circuit simulation device 11 according to the first embodiment are described by referring to FIG. 2.

A route search device 12 searches for a route through which a signal is transmitted for a designed electronic circuit, and extracts a route used in simulating the verification of the operation. A simulation device 13 performs a timing analysis, a waveform analysis, etc. as simulation, and outputs the results.

The route search device 12 comprises: a clock route search device 14 for carrying out a search for a route for a timing analysis for a clock route through which a clock signal is transmitted; a data route search device 15 for carrying out a search for a route for a timing analysis for a data route through which a data signal is transmitted; and a route search device 16 for pulse width check for carrying out a search for a route for a waveform analysis (pulse width check) for a clock route. Thus, the search result from each of the clock route search devices 14 through 16 is transmitted to the simulation device 13. Furthermore, it is not necessary for the route search device 12 to comprise all of the clock route search devices 14 through 16.

FIG. 3 shows the configuration of the program performed by the route search device 12 mounted in the electronic circuit simulation apparatus according to the first embodiment of the present invention, and shows the configuration of a program 21 executed by the route search device 12, and each type of data referred to when the program 21 is executed.

The program 21 comprises: a clock route search routine 22 for realizing the clock route search device 14; a data route search routine 23 for realizing the data route search device 15; and a route search routine 24 for pulse width check for realizing the route search device 16 for pulse width check. With the configuration, each of the clock route search devices 14 through 16 can be realized by the route search device 12 executing the program 21 loaded and stored in a hard disk, etc. mounted in the hard disk device.

The program 21 refers to a library DB1, a net list DB2, and a wire length database DB3. The library DB1 is a database in which a number of cells that are basic elements in logical design are entered, and also stores various types of data indicating the operation and characteristic (including a delay time) of each cell. The net list DB2 stores data indicating the mutual relationship among the cells entered in the library DB1. The wire length database DB3 stores data such as the length of the wiring connecting the cells, etc.

A designed electronic circuit is expressed by the databases DB1 through DB3. Each of the routines 22 through 24 carries out a search for a route for the electronic circuit expressed by the databases DB1 through DB3.

Each of the routines 22 through 24 carries out a search for a route by referring to the condition groups 25 through 27 configured by one or more conditions. The conditions configuring each of the condition groups 25 through 27 can be set by defining the relationship or the states to be effective among a plurality of routes having the same junction pins set in consideration of the type of a target route, a purpose of searching for the route, etc. The conditions can be set (including the automatic setting depending on the electronic circuit) in advance in the program 21, but can be provided by other programs. Furthermore, a user can appropriately set them.

As the above mentioned condition group 26, for example, condition or a combination of conditions satisfied by a route to be distinguished from other routes in the data routes from the starting pin to the end pin are set. With the configuration, a search for a route by the data route search routine 23 is carried out by generating data indicating a pin immediately before the pin, and a route identification code for identification of a route for each pin while passing control forward step by step from the starting pin. The value of the route identification code is determined such that a route can be distinguished from others by the type, number, or combination of conditions satisfied in the conditions forming the condition group 26 at least by setting the value not set after it proves that the conditions have been satisfied.

The data route search routine 23 instructs the data route search device 15 to carry out such a search for a route. Thus, a route is extracted by type of route distinguished from others by a satisfied condition in consideration of all routes. That is, a route is extracted by distinguishing it from others for each route satisfying a different condition. As a result, a route to be extracted for simulation can be extracted without fail.

On the other hand, the above mentioned condition groups 25 and 27 contain one condition or a plurality of conditions to be satisfied when the two or more routes having the same junction pin are put (synthsized) into the one route are set. Thus, the search for a route by each of the route search routines 22 and 24 can be carried out by confirming for each pin whether or not two or more routes satisfying the condition(s) while passing control forward step by step. If there are two or more routes satisfying the condition (s) and joining one another, then one of them is selected and set aside (or they are synthesized).

Each of the clock route search routines 22 and 24 instructs each of the route search devices 14 and 16 to carry out such a search for a route, thereby removing the routes not to be considered in the simulation at the step of searching for a route while considering all routes.

The simulation device 13 uses simulation for a timing analysis, a waveform analysis, etc. based on the result of a search for a route carried out by each of the route search devices 14 through 16. A timing analysis is done using a result of a search for a route carried out by the route search devices 14 and 15, and a waveform analysis (pulse width check) is done using a result of a search for a route carried out by the route search device 16. The electronic circuit simulation apparatus 11 outputs the results on a display device, a printer, an external device connected through a LAN, etc.

In the search for a route carried out by each of the route search devices 14 through 16, the number of extracted routes can be the smallest possible without removing the routes to be possibly considered in the simulation. As a result, the simulation carried out using at least one of the results of the searches for a route can be constantly realized with high precision, and the requirements for the memory and the processing time can be successfully reduced.

Second Embodiment

FIG. 4 shows the configuration of a CAD apparatus in which the electronic circuit simulation apparatus (hereinafter referred to as a simulation apparatus for short) according to the second embodiment of the present invention is mounted.

The CAD apparatus is realized by installing a program for directing a computer to function as a CAD apparatus. As shown in FIG. 4, the CAD apparatus comprises a CPU 31, memory 32, an input device 33 which can be, for example, a mouse, a keyboard, etc., an output device 34 which can be, for example, a display device, etc., an external storage device 35 which can be, for example, a hard disk device, etc., a medium drive device 36 for driving CD-ROM, DVD-ROM, a magneto-optical disk, a floppy disk, etc., and a network connection device 37 such as a LAN, etc. for communicating a signal through a network. These units are interconnected through a bus 38.

The above mentioned program is stored in the storage medium (for example, a hard disk) mounted in the external storage device 35. Otherwise, a library (database) used in designing an electronic circuit is stored in the storage medium. After designing a layout, a wiring length database storing the wiring length between pins is stored. A route between pins is hereinafter referred to as a path to be distinguished from other routes.

Figure 5:
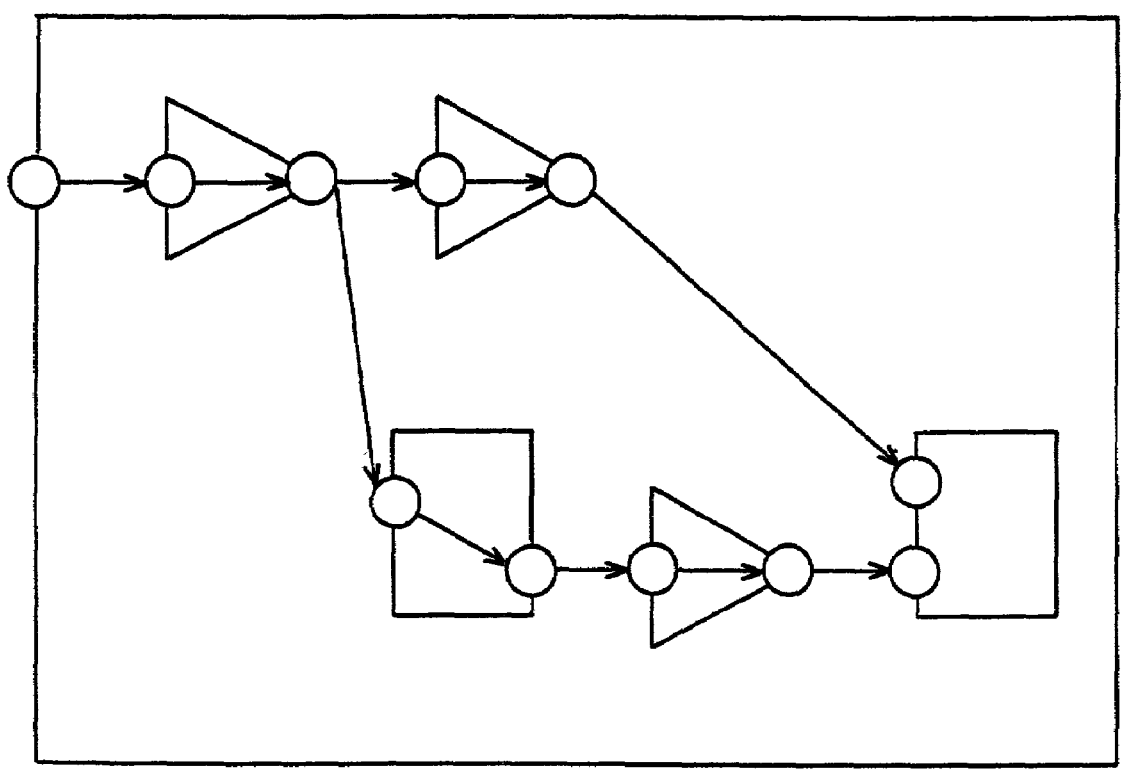
FIG. 5 shows the relationship between a cell and a pin.

FIG. 5 shows the relationship between a cell and a pin. In FIG. 5, a circle indicates a pin, and a line provided with an arrow indicates a path between pins. Three inverters and two flipflops (FF) are shown as cells. A circuit configured by combining one or more cells is hereinafter referred to as a module.

As shown in FIG. 5, a path exists in a cell, and a pin possibly exists outside a cell. A pin existing outside a cell is specified for input of a signal into a module, or for output of a signal from a module.

Figure 6:
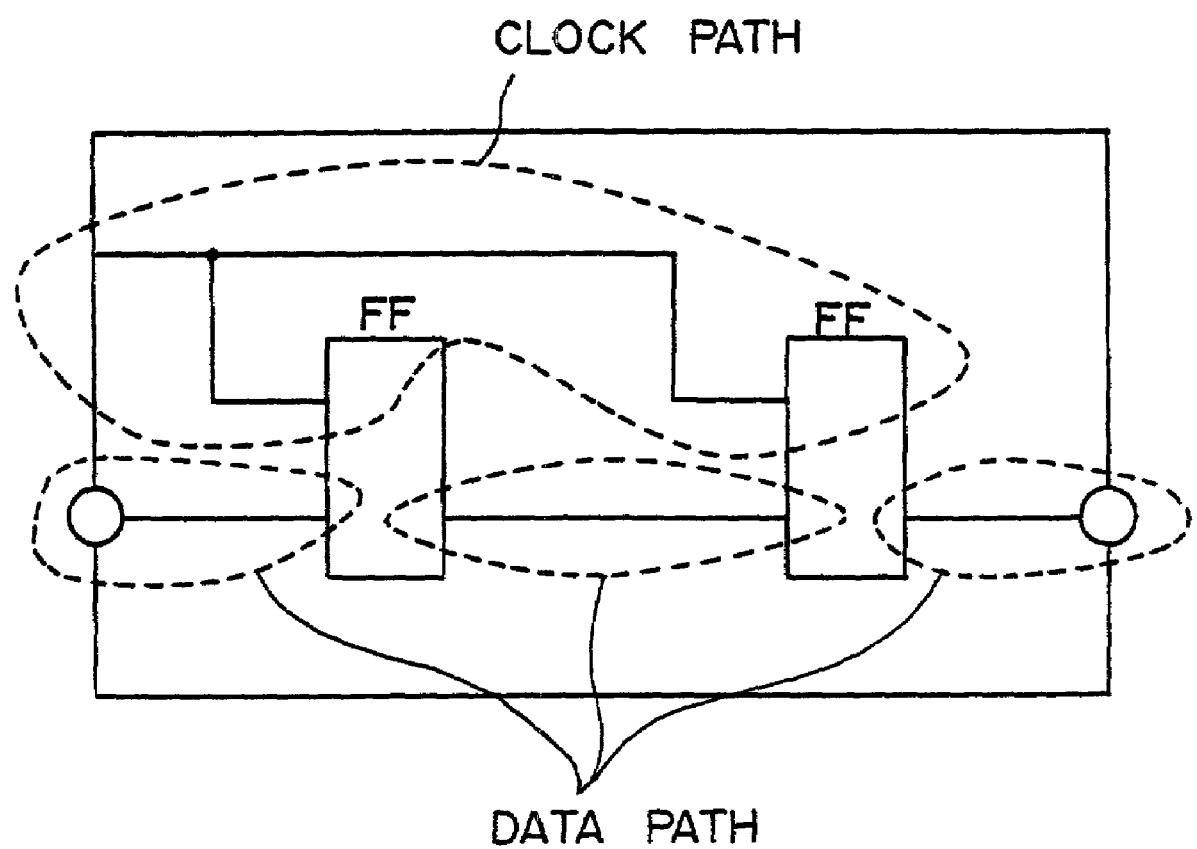
FIG. 6 shows a clock path and a data path.

Signals transmitted through a path can be divided into clock signals for driving a device and data signals provided for the device. Therefore, a path through which the clock signal is transmitted is referred to as a clock path, and a path through which the data signal is transmitted is referred to as a data path. FIG. 6 shows portions corresponding to the clock path and the data path in the circuit configured by two FFs, for example.

At present, it is normal that routes repeat branching and joining one another in a complicated manner. Therefore, it is not practical to do a timing analysis or a waveform analysis by extracting all routes. According to the present embodiment, the following search for a route is carried out, and a route not to be considered in all routes can be removed in a step of searching for a route, thereby maintaining high precision and reducing a processing time and requirements for the memory capacity.

According to the present embodiment, three types of search for a route are carried out in an electronic circuit. The method for the search for a route is described below in detail by referring to FIGS. 7 through 20.

First, the search for a route (data route) through which a data signal is transmitted is described.

Figure 7:
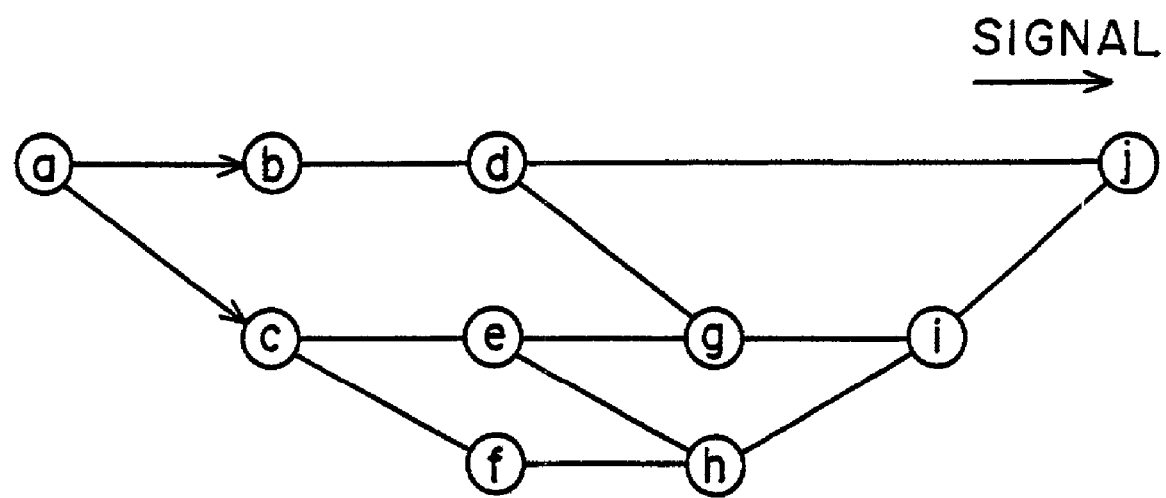
FIG. 7 is a graph showing the connection between pins connected through a data path in an electronic circuit.

FIG. 7 is a graph indicating the connection between pins connected through a data path in an electronic circuit. For easier understanding, the method for searching for a route is described in detail by referring to a search for a route (tracing a data path) for the graph shown in FIG. 7.

In FIG. 7, the circles encompassing a through j indicate pins, and lines connecting pins indicate data paths. The signals are assumed to be transmitted from left to right. Therefore, the starting pin is pin a, and a pin ending the path from the pin a is a pin j.

The route (data route) formed by a data path can have a element (for example, a selector) not operating interlockingly in the route. The route containing such a element has to be distinguished from other routes. Thus, before starting a search for a route, a route condition to be satisfied by a route to be distinguished from other routes is set. The condition can be set by a user, or can be automatically set. In this example, the following conditions are set for convenience.

Route Condition 1) Route through pin b and pin g in this order

Route Condition 2) Route through pin d

Figure 8:
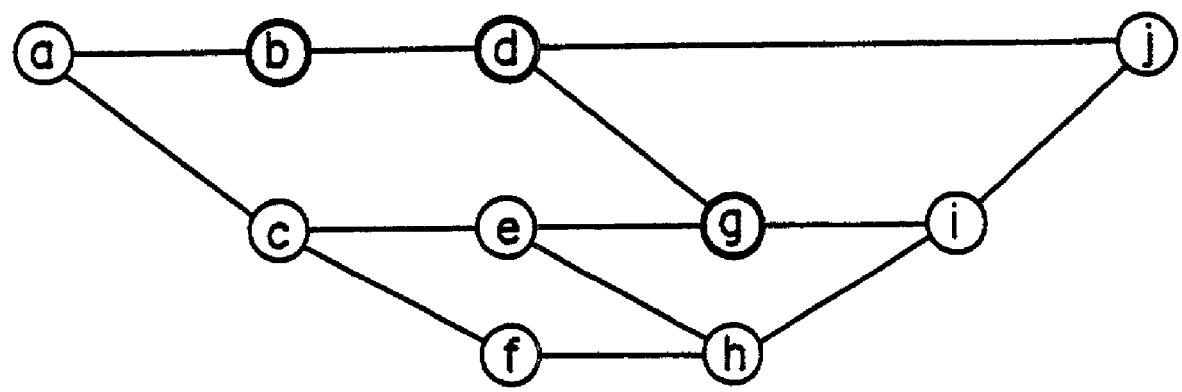
FIG. 8 shows the pins specified in the route condition.

The pin specified in the route condition has a flag set to describe it. When the route conditions 1 and 2 are set, flags are set respectively for pins b, g, and d. In FIG. 8, the pins b, g, and d are shown by bold lines.

A search for a route is carried out by passing control forward step by step in a data path from the starting pin a. If another pin exists at one step forward in the data path, an event is newly generated to manage the searching process, and the information (event information) about the contents of the event is stored corresponding to the pin. Since the starting pin a is not preceded by another pin, an event is generated when the search for a route is started to store the information.

The graph shown in FIG. 7 contains the pins a, and c through e as pins indicating the branch of a signal, and the pins g through j as pins indicating the junction of signals. This refers to a plurality of routes passing the same pins. Thus, an event is generated such that the routes passing the same pins can be distinguished from each other.

Figures 9A, 9B:
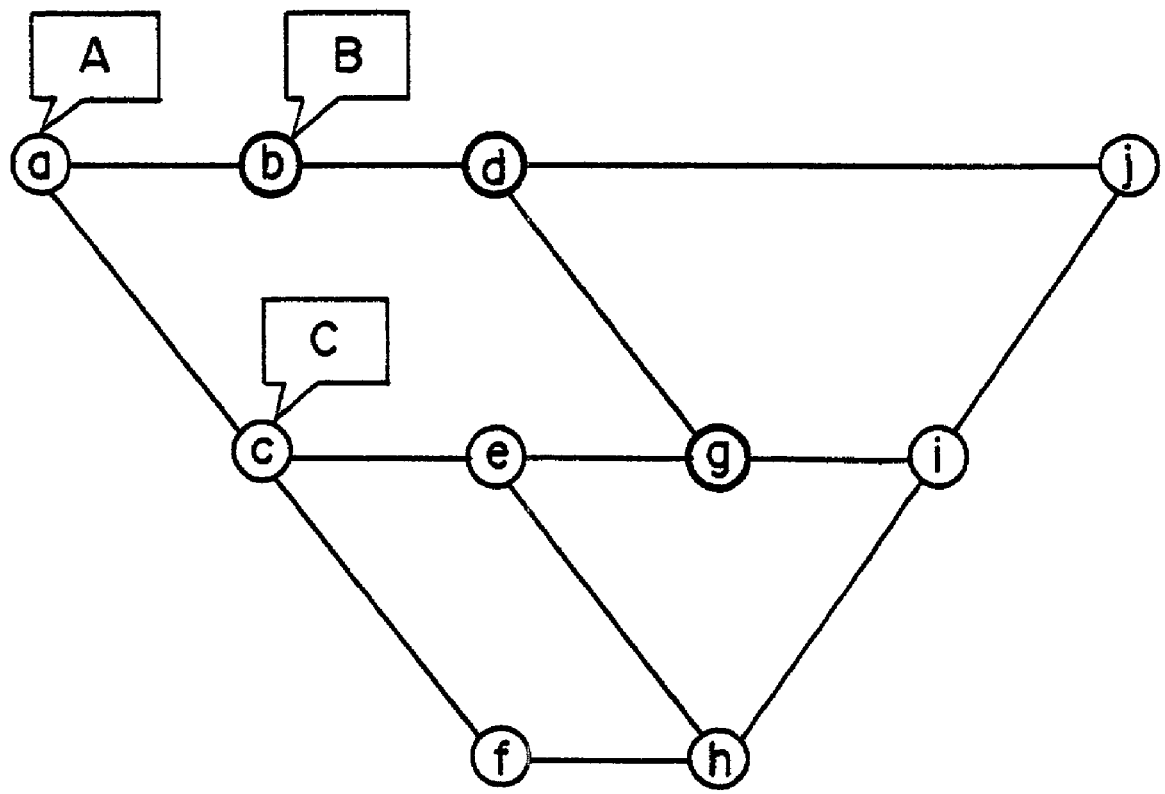
FIG. 9A shows an event generated for each pin when control is passed one step forward in the data path.
FIG. 9B shows the contents of the event information about an event generated for each pin when control is passed one step forward in the data path.

FIG. 9A shows an event generated for each pin when control is passed one step forward in the graph shown in FIG. 7. FIG. 9B shows the contents of the event information about the event generate for each pin. In FIG. 9A, characters A through C added to respective pins indicate the events generated for the respective pins a through c. Hereinafter, a character added to each pin refers to the event name representing the event.

As shown in FIG. 9A, events are generated for pins a through c by passing control one step forward from pin a in the data path. As the event information, the data (an event name in this example) of an event generated at the previous step and the route identification code are stored for each event as shown in FIG. 9B. The event name generated at the previous stage is stored so that the route can be traced backward. The route identification code is stored to extract a route as distinguished from others by the route condition satisfied by the route. The value of the route identification code is changed into a value other than a value not set when control is passed to one pin forward the pin with a flag.

Since no event exists at the previous stage in an event A corresponding to the pin a, the data indicating the information is stored as the event at the previous stage. As a route identification code, a predetermined initial value (0 in this example) is stored. In events B and C respectively corresponding to the pins b and c, A is stored as the event name at the previous stage. As a route identification code, 0 is stored as in the event A because control is not passed forward the pin having a flag.

Figures 10A, 10B:
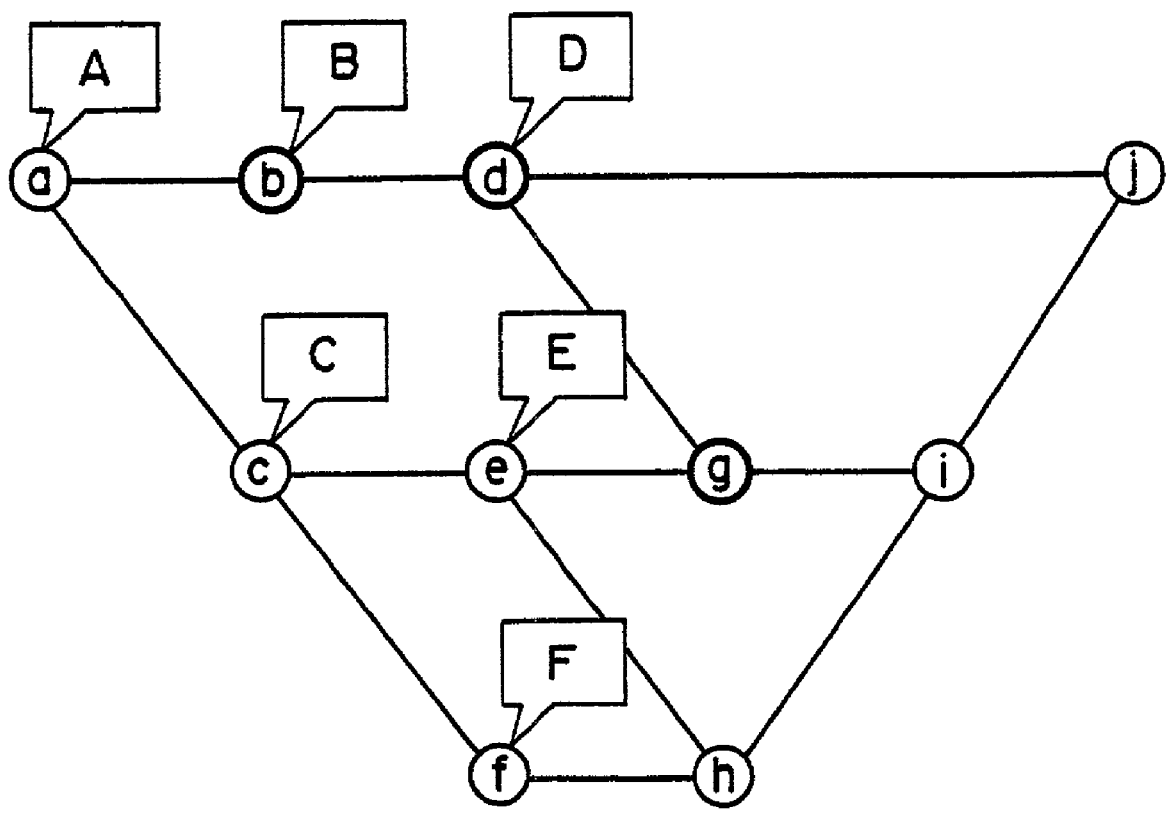
FIG. 10A shows an event generated for each pin when control is passed two steps forward in the data path.
FIG. 10B shows the contents of the event information about an event generated for each pin when control is passed two steps forward in the data path.

When control is passed one step forward in the data path from the above mentioned state, events are generated for the pins d, e, and f as shown in FIG. 10A. Since the pin d is located forward the pin b specified by the route condition 1, the value of 1, which has not been set, is stored as a route identification code in the event D corresponding the pin d as shown in FIG. 10B. The values of the route identification code of other newly generated events E and F remain 0.

Figures 11A, 11B:
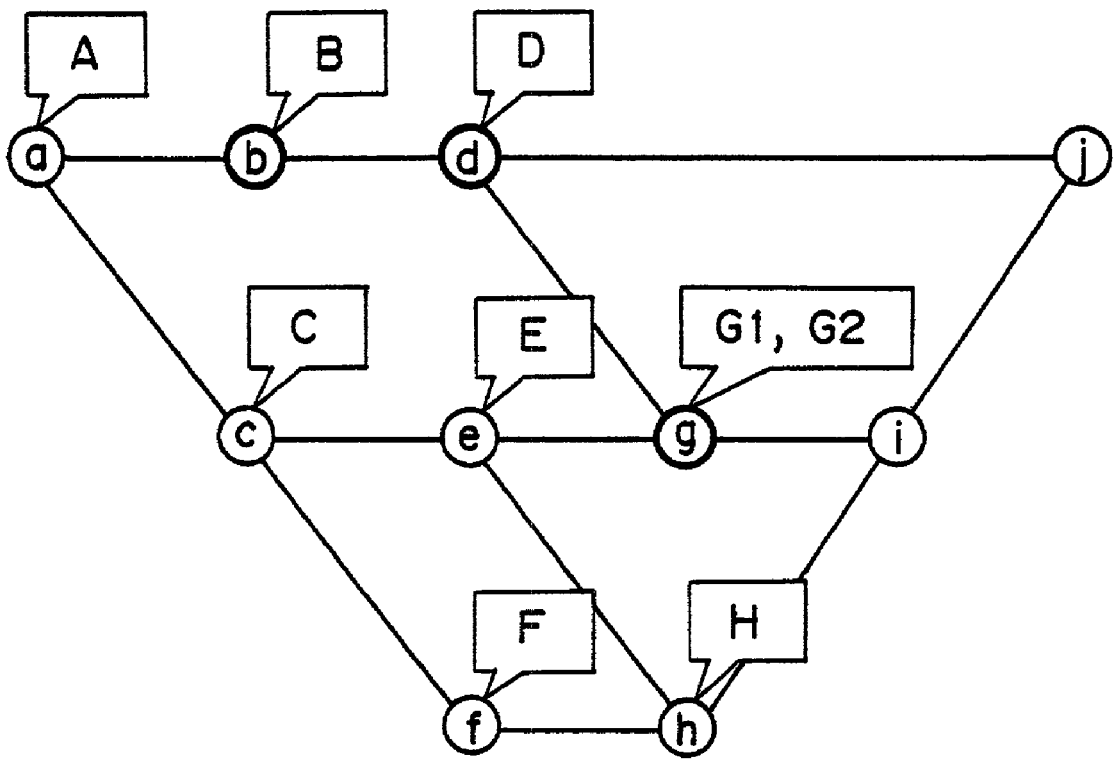
FIG. 11A shows an event generated for each pin when control is passed three steps forward in the data path.
FIG. 11B shows the contents of the event information about an event generated for each pin when control is passed three steps forward in the data path.

When control is passed one step forward in the data path from the state shown in FIG. 10A, events are generated for pins g and h as shown in FIG. 11A. Since the pin j can be the end point, no events are generated here.

A pin g is positioned one step forward from the pins d and e in the data path. Therefore, two events G1 and G2 are generated for the pin g. The pin d immediately before the pin g has a flag, and is specified by the route condition 2. The event D is generate for the pin. Therefore, as shown in FIG. 11B, the value of the route identification code is 2, which has not been set before, in the event G1 having the event D as an event at the previous stage.

The pin h is located one step forward in the data path from the pins e and f. However, no flags are added to the pins e and f, and the route identification code of the events E and F generated for the pins are 0. Therefore, only one event H is generated for the pin h by selecting one of them. In this example, the event F is selected as the heading event. The route identification code remains 0 in the events G2 and H.

Figures 12A, 12B:
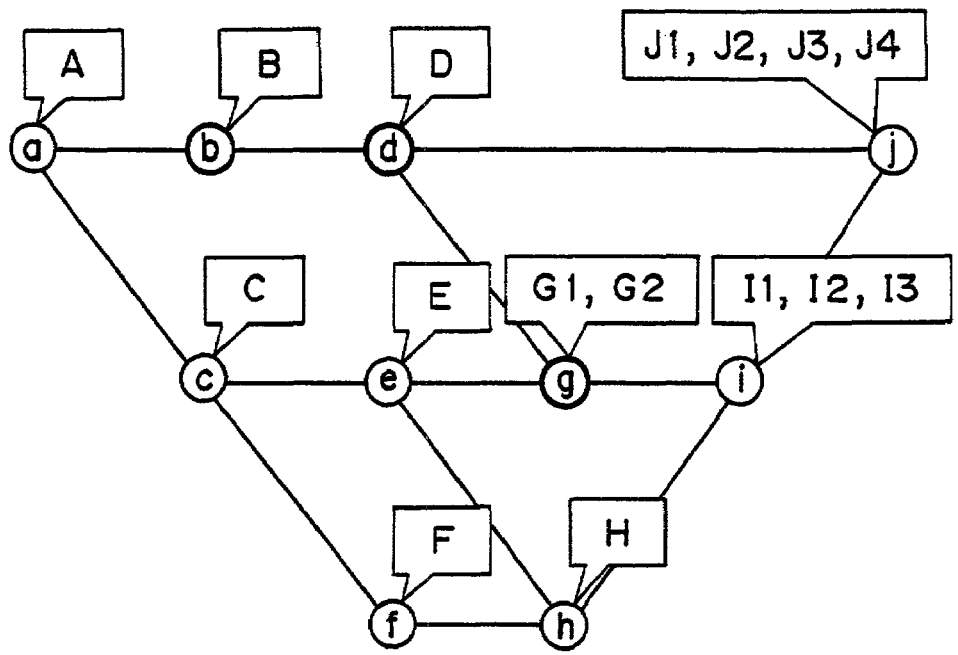
FIG. 12A shows an event generated for each pin when control is passed to the end of the data path.
FIG. 12B shows the contents of the event information about an event generated for each pin when control is passed to the end of the data path.

When a search is carried out to the end of the data path, that is, to the pin j which is the end point from the state shown in FIG. 11A, events are generated for the pins i and j as shown in FIG. 12A.

The pin i is located one step forward from the pins g and h in the data path. The two events G1 and G2 are generated for the pin g having a flag. One event H is generated for the pin h. Thus, three events I1 through I3 are generated for the pin i. To indicate the pin g as having a flag, the value of 3 which has not been set before is stored as a value of the route identification code for the event I1 having the event G1 as the preceding event as shown in FIG. 12B. For the event I2 preceded by the event G2, the value of 4 which has not been set before is stored as a value of the route identification code.

The pin j is an end point, and is located one step forward from the pins d and i in the data path. The pin d has a flag and one event D is generate for the pin. Three events I1 through I3 are generated for the pin i. As a result, four events J1 through J4 are generated for the pin j. For the event J1 preceded by the event D, the value of 5 which has not been set before is stored as a value of the route identification code. In the other events J2 through J4, the value of the route identification code is the same as the value of the preceding event.

By generating an event for the pin j, the event generating process is completed. Afterwards, the route is specified for each event generated for the pin j. The routes specified from the events J1 through J4 can be specified as follows.

J1: a→b→d→j (route 1)
J2: a→b→d→g→i→j (route 2)
J3: a→c→e→g→i→j (route 3)
J4: a→c→f→h→i→j (route 4)

When a search for a route is carried out in the graph shown in FIG. 7 with the above mentioned route conditions 1 and 2 set, four routes are extracted. However, there are five routes existing in the graph shown in FIG. 7. Thus, the number of extracted routes can be reduced by setting a flag at a pin specified in a route condition and generating an event using a route identification code. Since the number of routes is reduced by distinguishing a route from others by a difference in route condition to be satisfied, the problem that a route to be extracted may not be extracted in some searching processes can be avoided without fail. Therefore, the precision of a timing analysis can be improved.

The routes 1 through 4 specified by the events J1 through J4 are checked as to which of the predetermined route conditions 1 and 2 is satisfied. As a result, the route 1 satisfies the route condition 2, the route 2 satisfies both route conditions 1 and 2, and the routes 3 and 4 satisfy none of the route conditions 1 and 2. Therefore, one of the routes 3 and 4 can function as a representative. Thus, three routes satisfying different route conditions can be extracted from among the routes from the pin a to the pin j.

According to the present embodiment, a representative route is selected between the above mentioned routes 3 and 4, or an event is selected for the junction pin of signals according to predetermined selection rules. The selection rules depend on the delay model. In an assignment delay model in which a delay time is different depending on each path and an uncertain delay model (maximum-minimum delay model) in which a delay time has maegin for each path, the maximum or minimum delay time of a route is selected.

To select a route as described above, each event is assigned a delay time to be taken when each event occurs. The delay time for an event is, for example, a total delay time obtained by adding a delay time of a data path when control is passed one step forward in the data path to a delay time of the event immediately before. The delay time of a path containing the data path is, for example, obtained by referring to the library or the wiring length database.

According to the present embodiment, the value of the route identification code is changed into a value not set before at the pin having a flag and located one step forward. However, the value of the route identification code can be changed depending on whether or not the route condition has been satisfied. In any method of changing the value of the route identification code, the value of the route identification code of the route satisfying the route condition can be a value different from the values of other routes.

Described below is the search for a route (clock route) through which a clock signal is transmitted.

For example, when an FF on the transmission side of a data signal, and an FF on the reception side of the signal are provided with a clock signal from the same clock source, the difference between the delay time required for the clock signal output from the clock source to reach the FF on the transmission side and the delay time required for the signal to reach the FF on the reception side much affects the operation. This is much considered in the search for a route through which the clock signal is transmitted. The principle of the method is described in detail by referring to FIGS. 13 through 15.

Figure 13:
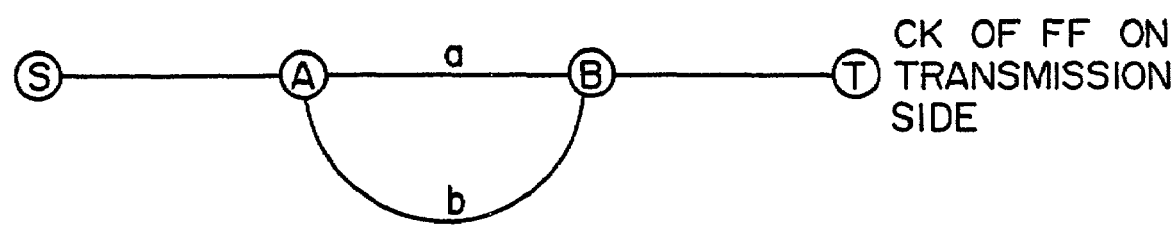
FIG. 13 shows the principle of the method of searching a route through which a clock signal is transmitted (1)

The pin S shown in FIG. 13 is a clock source, and the pin T corresponding to the CK terminal (terminal through which a clock signal is input) of the FF on the transmission side. The route from the pin S which is a clock source to the pin T is branched on the pin A, and join on the pin B. Reference characters a and b shown in FIG. 13 denote a clock path connecting the pins A and B.

There are two routes from the pin S to the pin T using the clock paths a and b. The difference in delay time between the two routes matches the difference in delay time between the clock paths a and b.

Assuming that the delay time of the clock path a is longer than that of the clock path b, there must be a pin on which a clock signal is branched toward the FF on the reception side. A setup time check is considered as a timing analysis. The pin is referred to as a branch pin in this example. The delay times of the clock paths a and b are respectively expressed as a delay (a) and a delay (b).

Figure 1A:
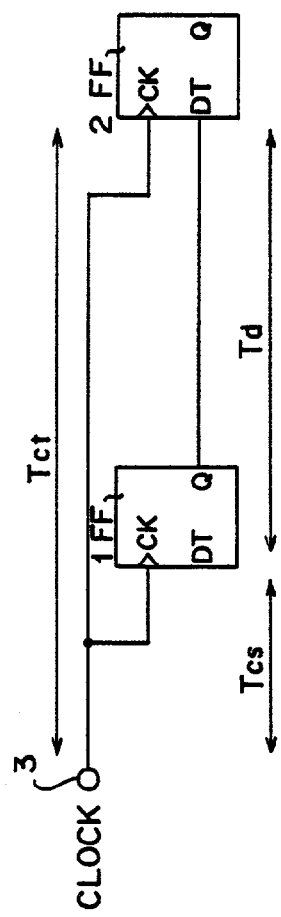
FIG. 1A shows an example of a circuit to be timing-analyzed.
Figure 1B:
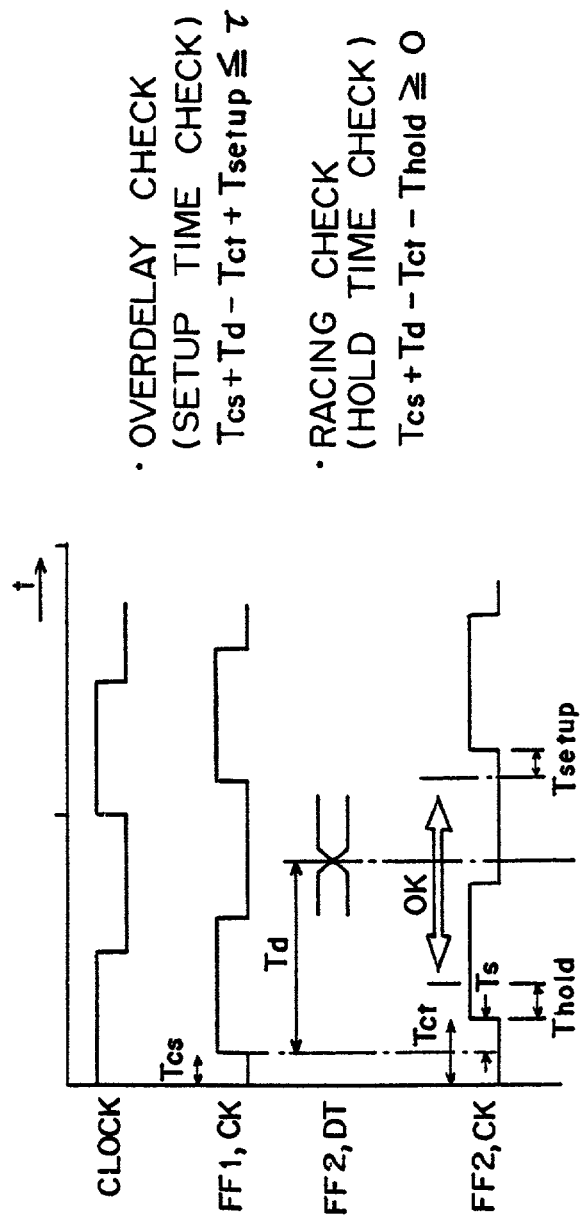
FIG. 1B is a timing chart of the operation of the circuit shown in FIG. 1A.

The skew (refer to FIG. 1B) indicates the difference in delay time required by the same clock signal to reach the FF on the transmission side and the FF on the reception side. In the setup time check, the larger the skew is, the severer it is.

When the above mentioned branch pin is between the pins S and A, a delay (a)>a delay (b), and the skew is larger in the route of the clock path a to the FF on the transmission side. When the branch pin is between the pins B and T, there is no difference in skew between the clock paths a and b as the route to the transmission side. Thus, if there is a branch pin to the FF on the reception side outside the region (in this example, between the pins A and B) in which there are different clock paths through which a clock signal can be transmitted, then the route from the clock source (the pin S in this example) to the FF on the transmission side indicates the maximum (worst) skew when the delay time is the longest.

Next, assume that there is a branch pin in a region in which there are different clock paths of a clock signal. As shown in FIG. 14, the pin C connected to the FF on the reception side is between the pin A and the pin B. Reference characters a through c shown in FIG. 14 respectively denote a clock path connecting the pin A to the pin B, a clock path connecting the pin A to the pin C, and a clock path connecting the pin C to the pin B. The delay time of each of the clock paths a through c can be expressed using the characters.

There are two routes through the pin A and the pin B through which a clock signal is transmitted to the FF on the transmission side. There are two pins A and C as branch pins. The skew when the pin A is a branch pin is expressed as a skew (a), and the skew when the pin C is a branch pin is expressed as a skew (c).

If the delay time of the route between the pin A and the pin B is larger than the delay time of the route through the pins A, C, and B, the inequality a>b+c is effective. At this time, skew (A) and skew (C) are used in the following equations.

$$\text{skew } (A) = a - b + k \text{ ($k$ indicates a constant independent of a route)} \quad (1)$$

$$\text{skew } (C) = c + k$$

Therefore, since a>b+c and a−b>c, the inequality skew (A)>skew (C) is effective.

On the other hand, when the delay time of the route between the pin A and the pin B is smaller than the delay time of the route through the pin A, the pin C, and the pin B, the inequality a<b+c exists. Therefore, as described above, the inequality skew (A)<skew (C) is derived.

As described above, the skew becomes larger when there is a branch pin in a route having a longer delay time. Therefore, only the route having the largest delay time is to be considered for the route to the FF on the transmission side. Similarly, only the route having the shortest delay time is to be considered for the route to the FF on the reception side. On the other hand, when the hold time check is considered as a timing analysis, the route having the shortest delay time is to be considered for the route to the FF on the transmission side, and the route having the longest delay time is to be considered for the route to the FF on the reception side.

Figure 15:
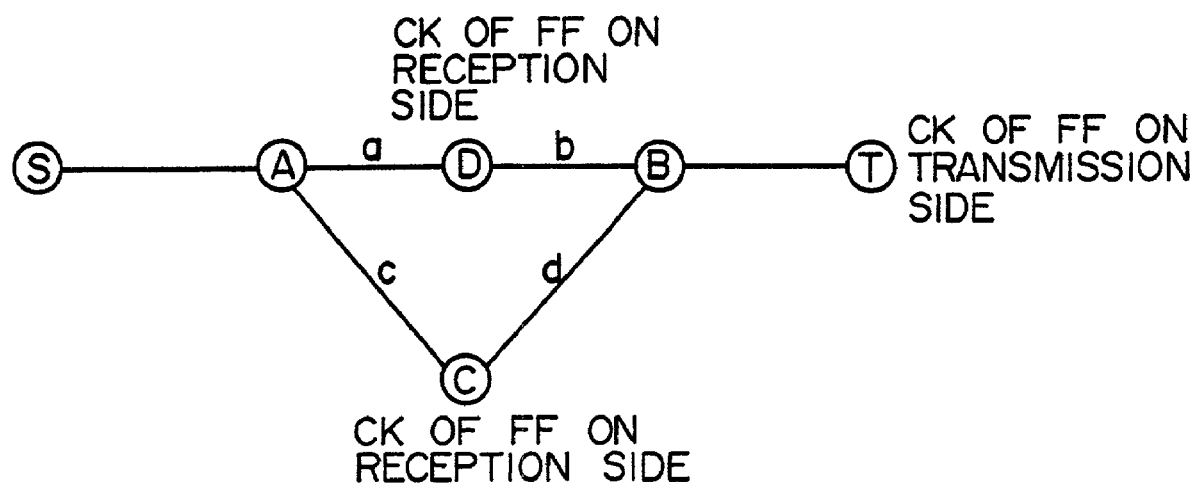
FIG. 15 shows the principle of the method of searching a route through which a clock signal is transmitted (3)

As shown in FIG. 15, there can be a plurality of routes to the FF on the reception side. In FIG. 15, reference characters a through d denote respective clock paths between pins and the corresponding delay times.

In the case as shown in FIG. 15, when the routes to the FF on the reception side from the pins C and D are separately considered, the skew is the worst in the setup time check when there is a branch pin in the route having the longest delay time in the routes to the FF on the transmission side from the pin S which is a clock source.

When there are a plurality of branch pins in the route having the longest delay time in the routes to the FF on the transmission side, the skew is the worst for the route having the shortest delay time in the routes to the FF on the reception side if the routes to the FF on the reception side from each branch pin are separately considered. Thus, it proves that the skew is the worst when there is a branch pin of the route having the shortest delay time in the routes to the FF on the reception side in the route having the longest delay time in the routes to the FF on the transmission side. In the hold time check, the opposite conditions and results can be described.

In the timing analysis, the worst result can be obtained in the above mentioned combinations of routes. Therefore, when there are a plurality of routes having the same end pin, a representative route having the worst result of the timing analysis is selected from among the plurality of routes. A plurality of routes in all routes which can be put into one group are combined. Thus, the number of routes to be considered in the timing analysis can be reduced with high precision maintained. According to the present embodiment, the number of routes is reduced with the following points taken into account to improve the precision. The practical explanation is given below.

In the uncertain delay model (maximum-minimum delay model), the delay time of a path has margin as described above. When there is a difference in the maximum and minimum values in delay time (in most actual cases), the equation (1) is expressed as follows in the setup time check.

$$\text{skew } (A) = a - b \text{ (min)} + k$$

where b (min) indicates the shortest delay time in the clock path b, and the longest delay time is the value given in the equation (1). To the shortest delay time, '(min)' is added, and no symbol is added to the longest delay time.

In FIG. 14, when the longest delay time in the route passing the pins A and B is longer than that in the route passing the pins A, C, and B, a−b>c based on a>b+c. Therefore, a−b (min)>a−b>c, thereby deriving skew (A)>skew (C).

On the other hand, when the longest delay time in the route passing the pins A and B is shorter than that in the route passing the pins A, C, and B, a−b<c based on a <b+c.

However, since a−b (min)>a−b, the inequality a−b (min)<c is not always effective. Therefore, the inequality skew (A)<skew (C) is not always effective, either. For example, if a=10, b=10, c=1, and b (min)=8, then the inequality skew (A)<skew (C) is not effective.

However, if the inequality b (min)+c (min)>a is effective, then the inequality a−b (min)<c (min)<c is also effective. Therefore, skew (A)<skew (C) is also effective. Thus, it proves that only the route passing the pins A, C, and B can be considered.

Thus, when the inequality b ( min)+c (min)>a is effective, only the route passing the pins A, C, and B is to be reserved (the route passing the pins A and B is contained in this route). If the inequality is not effective, the route passing the pins A, C, and B and the route passing the pins A and B are to be reserved.

Since there is only one clock source which is a starting point, there is always a branch pin if a plurality of clock signals join a pin. Therefore, for example, if two clock signals join one pin, then a branch pin is obtained, the shortest delay time in the section from the branch pin to the junction pin is obtained by adding the shortest delay time of the path from the branch pin to the junction pin of a clock signal in the route having the longest delay time of the route obtaining by adding the longest delay time of the path, and one route is represented depending on whether or not the obtained shortest delay time is equal to or longer than the longest delay time of the section in the route having a shorter longest delay time of the route.

However, when the inequality b (min)+c (min) >a is effective, the inequality a−b (min)<c is also effective as described above. Thus, the shortest delay time of the route from the branch pin to the junction pin is not obtained, but the shortest delay time of the route from the branch pin to another branch pin located immediately before the junction pin is obtained. From the other branch pin to the junction pin the longest delay time of the path can be added to the obtained shortest delay time. In this case, since b (min)+c>a, can be more easily effective than b (min)+c (min)>a, the routes can be more efficiently reduced with the deterioration of the precision of the timing analysis avoided. When a hold time check is assumed, the routes are reduced in the opposite method of the setup time check.

According to the present embodiment, the routes are reduced with the following points taken into account.

There can be a route having a clock source other than the starting point in the routes in which a clock signal is transmitted. Therefore, the routes having different clock source immediately before are not target for selecting, thereby avoiding the deterioration of the precision of the timing analysis.

A clock signal is not always transmitted inphase through a route. For example, the phase can be inverse by an inverter in the route containing the inverter, and the skew can be changed with the inversion of the phase. This indicates the possibility of different combinations of routes for the worst result of the timing analysis depending on the difference in transmission phase. Therefore, the routes which are not inphase on the junction pin in the transmission of a clock signal output from a clock source are not target for selecting, thereby avoiding the deterioration of precision in the timing analysis.

As described above, there can be a route having a plurality of clock sources. Therefore, according to the present embodiment, a route identification code is assigned to a route in the search for a route in which a clock signal is transmitted. The value of the route identification code is changed into a value which has not been set before when a pin specified as a clock source is passed in the process of passing control forward. Thus, the routes having different values of the route identification code are not put into the same group.

As described above, according to the present embodiment, if all of the following conditions are satisfied among two or more routes in a plurality of routes whose paths concentrate on the same pin, then the routes satisfying all the conditions are put into the same group. Thus, a route which can output the worst result of the timing analysis is not removed. The condition is hereinafter referred to as a selection condition.

Selection condition 1) The clock source immediately before is identical.

Selection condition 2) On the junction pin, the signal from the clock source immediately before is inphase in transmission.

Selection condition 3) The value of the route identification code is identical.

Selection condition 4) When the shortest delay time in the section from the branch pin to the junction pin obtained by adding the shortest delay time of each path in the route having the longest delay time in the section is equal to or longer than the longest delay time in the section of other routes when a search for a route is carried out while computing the longest delay time of each route using the longest delay time of each path; and When the longest delay time in the section from the branch pin to the junction pin obtained by adding the longest delay time of each path in the route having the shortest delay time in the section is equal to or shorter than the shortest delay time in the section of other routes when a search for a route is carried out while computing the shortest delay time of each route using the shortest delay time of each path The above mentioned selection condition 4 can be replaced with the following selection condition 4'.

Selection condition 4') When each path from the branch pin to another branch pin located immediately before the junction pin in the route having the longest delay time in the section from the branch pin to the junction pin is the shortest delay time, and the delay time in the section obtained by adding the longest delay time of each path in the subsequent section is equal to or longer than the longest delay time in the section of the other routes when the search for a route is carried out while computing the longest delay time of each route using the longest delay time of each path; and When each path from the branch pin to another branch pin located immediately before the junction pin in the route having the shortest delay time in the section from the branch pin to the junction pin is the longest delay time, and the delay time in the section obtained by adding the shortest delay time of each path in the subsequent section is equal to or shorter than the shortest delay time in the section of the other routes when the search for a route is carried out while computing the shortest delay time of each route using the shortest delay time of each path;

An example of a search for a route carried out by referring to the above mentioned selection conditions 1 through 4 or the selection conditions 1 through 3 and 4' is described below in detail by referring to FIGS. 16 through 20. In this example, the longest delay time of a route is to be obtained to avoid confusion. The longest delay time is obtained by adding the longest delay time of the path to the latest delay time each time control is passed one step forward.

Figure 16:
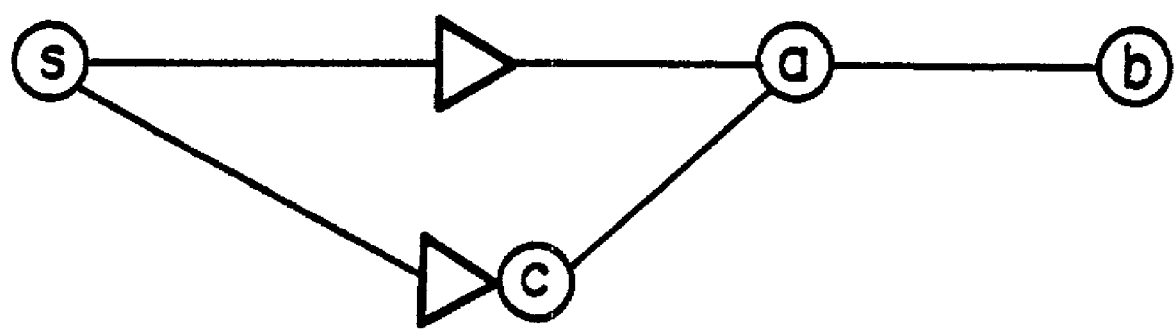
FIG. 16 shows an example of searching a route through which a clock signal is transmitted (1)

In FIG. 16, the clock source is a pin s, and the pin s is connected to the pins a and c. The pin c is connected to the pin a. Therefore, the paths join each other on the pin a.

When the pin c transmits inphase clock signals, the selection condition 1 is not effective between the route passing the pins s and a and the route passing the pins s, c, and a. Therefore, the routes are extracted, but are not selecting target.

Figure 17:
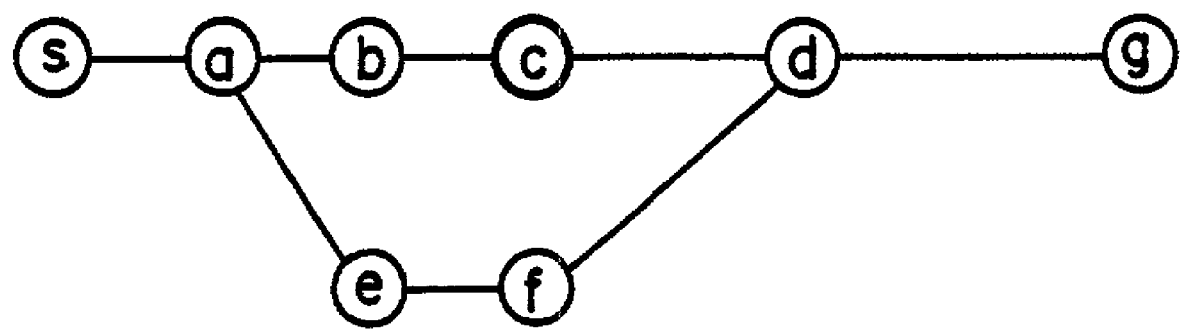
FIG. 17 shows an example of searching a route through which a clock signal is transmitted (2)

In FIG. 17, the clock source is indicated by the pin s and c, and there are two routes passing the pins s, a, b, c, d, and g, and the pins s, a, e, f, d, and g. The routes join each other on the pin d.

On the pin d, the preceding clock source in the route passing the pins s, a, b, c, d, and g is the pin c, and the preceding clock source in the route passing the pins s, a, e, f, d, and g is the pin s. Since the selection condition 1 is not satisfied between the routes, they are extracted, but are not selecting target.

Figure 18:
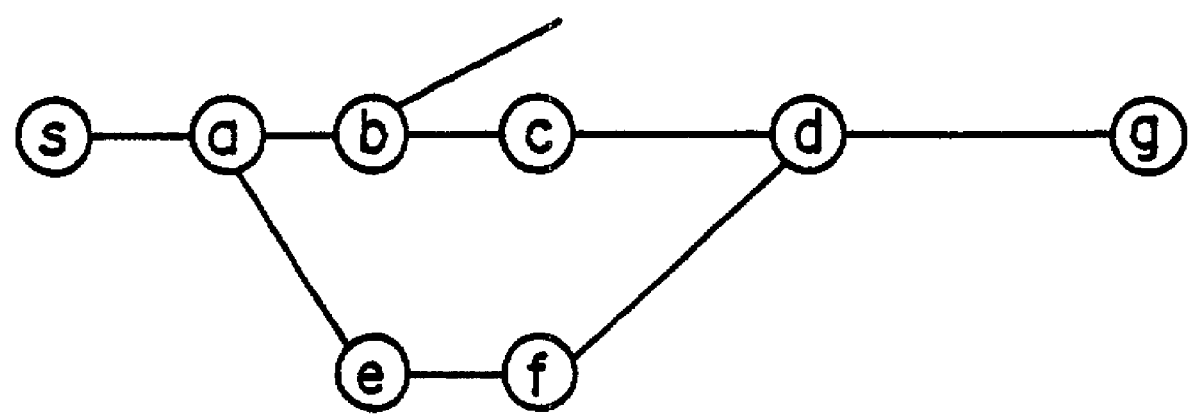
FIG. 18 shows an example of searching a route through which a clock signal is transmitted (3)

In FIG. 18, the clock source is indicated only by the pin s, and there are two routes passing the pins s, a, b, c, d, and g, and the pins s, a, e, f, d, and g. The routes join each other on the pin d. No signal inversion occurs on each pin.

The selection conditions 1 through 3 are satisfied between the two routes. Therefore, it is checked whether or not the selection condition 4 or 4' is satisfied. The longest delay time between the pins a and b is described as max (ab), and the shortest delay time between the pins is described as min (ab). Other pins can be similarly expressed. The route passing the pins s, a, e, f, d, and g can also be expressed as the route s-a-e-f-d-g. Other routes can be expressed similarly.

Since it is assumed that the longest delay time is obtained in this example, the longest delay time for the pin d in each route is compared with each other. Assume that the longest delay time is longer in the route s-a-b-c-d. The pin on which the routes branches is the pin a. Therefore, it is checked whether or not the selection condition 4 is satisfied, and the value computed by min (ab)+min (bc)+min (cd) is compared with the value computed by max (ae)+max (ef)+max (fd). As a result, if the former value is equal to or larger than the latter value, the search for the route s-a-e-f-d is aborted.

If it is checked whether or not the selection condition 4' is satisfied, the branch pin located immediately before the pin d is pin b. Therefore, the value computed by max (ab)+min (bc)+min (cd) is compared with the value computed by max (ae)+max (ef)+max (fd). As a result, if the former value is equal to or larger than the latter value, then the search for the route s-a-e-f-d is aborted. Since it is apparent from max (ab)+min (bc)+min (cd)>min (ab)+min (bc)+min (cd), the selection condition 4' can be more easily effective than the selection condition 4.

When the selection condition 4 or 4' is satisfied and the search for the route s-a-e-f-d is continued, the search for the route s-a-b-c-d is aborted. If the selection condition 4 or 4' is satisfied, a search for each route is continued. Each of the routes is assigned a different route identification code.

Figure 19:
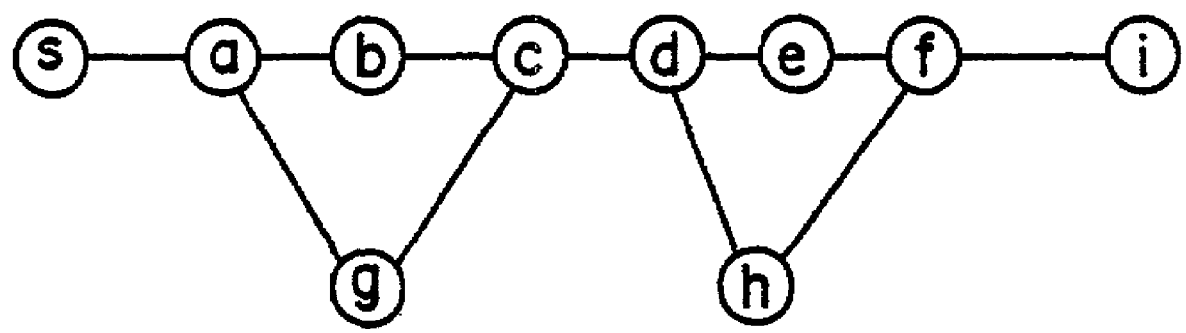
FIG. 19 shows an example of searching a route through which a clock signal is transmitted (4)

In FIG. 19, a clock source is indicated only by the pin s, and no signal inversion occurs on each pin. Up to the pin c, there are two routes s-a-b-c and s-a-g-c. In this example, since the selection condition 4 or 4' is not satisfied, the search for each route is continued. The value of the route identification code is 0 for the route s-a-b-c, and 1 for the route s-a-g-c.

When the search for a route is continued up to the pin d, there are two routes s-a-b-c-d and s-a-g-c-d up to the pin d. The pin d is connected to the pins e and h. As a result, it is considered that four routes, that is, the route s-a-b-c-d-e (route identification code 0), the route s-a-g-c-d-e (route identification code 1), the route s-a-b-c-d-h (route identification code 0), and the route s-a-g-c-d-h (route identification code 1), join one another on the pin f.

Based on the premise among the routes, the selection conditions 1 and 2 are effective. Since the selection condition 3 is not satisfied among the routes having different values of route identification codes, it is checked whether or not the selection condition 4 or 4' is satisfied among the routes having the same value of the code. That is, it is checked whether or not the selection condition 4 or 4' is satisfied between the routes s-a-b-c-d-e and s-a-b-c-d-h and between the routes s-a-g-c-d-e and s-a-g-c-d-h.

If it is determined that the selection condition 4 or 4' is satisfied between the routes s-a-b-c-d-e and s-a-b-c-d-h, the search for a route having a shorter longest delay time in the section from the pin d to the pin f is aborted. If it is determined that the selection conditions 4 and 4' are not satisfied, the search for each route is continued. If each route does not satisfy the selection conditions 4 and 4', a route having any of 0 through 3 as a value of the route identification code is finally extracted. If each route satisfies the selection condition 4 or 4', for example, only the route having the value of 0 or 1 as the route identification code is finally extracted.

route s-a-b-c-d-e-f-i (route identification code 0)
route s-a-g-c-d-e-f-i (route identification code 1)
route s-a-b-c-d-h-f-i (route identification code 2)
route s-a-g-c-d-h-f-i (route identification code 3)

The above mentioned search for a route is based on the longest delay time of a route, and the search for a route can also be carried out based on the shortest delay time of a route. When a pin for input or output of a data signal is referred to as a data pin, and a pin for input or output of a clock signal is referred to as a clock pin, a route having the longest delay time is used as a route to the lock pin of the cell on the transmission side of the data signal, and a route having the shortest delay time is used as a route to the clock pin of the cell on the reception side of the data signal in the setup time check carried out as a timing analysis. On the other hand, in the hold time check, a route having the shortest delay time is used as a route to the clock pin of the cell on the transmission side of the data signal, and a route having the longest delay time is used as a route to the clock pin of the cell on the reception side of the data signal. If there are a plurality of routes to the clock pin of the cell on the transmission side and/or to the clock pin of the cell on the reception side, then all possible combinations of the routes are checked.

Figure 20:
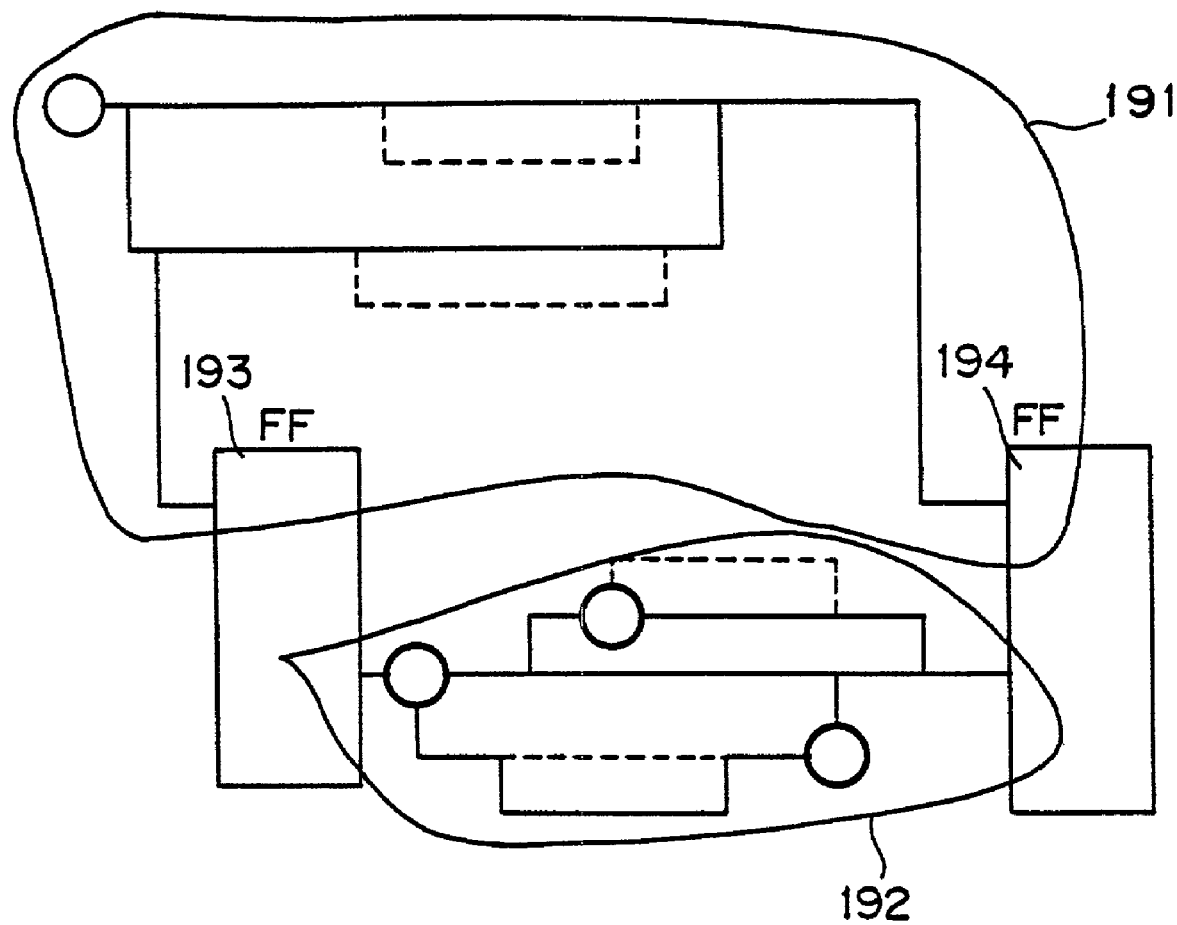
FIG. 20 shows the route extracted by a search for a route.

FIG. 20 shows the route extracted by a search for a route. In FIG. 20, an area 191 accommodates a clock path to be traced for a search for a clock route, an area 192 accommodates a data path to be traced for a search for a data route. An FF 193 is provided on the transmission side, and an FF 194 is provided on the reception side. The circle in a bold line indicates a pin specified in a route condition. In each of the areas 191 and 192, a solid line indicates a route extracted for a timing analysis, and a broken line indicates a route not extracted, that is, aborted in the searching process.

As shown in FIG. 20, since there is only one clock route from the clock source expressed as a circle in a solid line to the CK terminal of the FF 193, it is extracted. Two of the four clock routes from the clock source to the CK terminal of the FF 194 are extracted. Although there are five data routes from the FF 193 to the FF 194, only three routes passing the pins specified in the route condition are extracted. As a result, by carrying out the above mentioned search for a route, the timing check is performed 1×2×3=6 times in the example shown in FIG. 20.

The extracted route is possibly the worst route as a result of the timing check. Therefore, the precision is the same as that obtained in the timing check performed on all possible combinations of routes. The number of all possible combinations is, as described above, 1×4×5=20 because there are: one clock route from the clock source to the CK terminal of the FF 193; four clock routes from the clock source to the CK terminal of the FF 194; and five data routes from the FF 193 to the FF 194. Therefore, the frequency of the timing checks can be considerably reduced by reducing the number of extracted routes with the high precision maintained.

The requirements for the memory capacity can be reduced, and the processing time can be shortened in the process. Therefore, the timing check can be performed on a larger electronic circuit.

Described below is a search for a route for a pulse width check (waveform analysis).

A clock signal from a clock source changes its waveform during the transmission through a clock route. The changed waveform is checked in a pulse width check as to whether or not the waveform still maintains the form guaranteeing the operation of the FF, etc. The contents of the check include a time from the rise edge (rising) of a signal waveform to the next rise edge (hereinafter referred to as a first period width), a time from the rise edge to the subsequent fall edge (falling) (hereinafter referred to as a high level width), a time from the fall edge to the subsequent rise edge (hereinafter referred to as a low level width), and a time from the fall edge to the subsequent fall edge (hereinafter referred to as a second period width), that is, four types at maximum.

In the pulse width check, it is necessary to compute the total delay time of each edge for each route from the clock source which is a starting point to the pin to be checked, and to obtain each pulse width from the difference in total delay time between the edges and the waveform of the clock signal output from the clock source. However, as described above, since it is normal that routes repeatedly branch and join in a complicated manner in the currently designed circuits, it is not practical to obtain the total delay time between edges for each route. Therefore, according to the present embodiment, the branching and joining clock routes are unified as follows.

For example, if the width (high level width) of the high level of a clock signal on a pin is to be checked, and the signal from the clock source to the pin is transmitted without inversion, then the high level width is computed as follows.

high level width=(high level width at clock source)−((total delay time from clock source of rise edge on pin)−(total delay time from clock source of fall edge on pin))

Therefore, the high level width computed as described above is to be larger than the high level width specified in the timing analysis. However, since the path delay time includes the longest delay time and the shortest delay time, the high level width is to be computed with the worst case taken into account.

high level width=(high level width at clock source)−((total longest delay time from clock source of rise edge on pin)−(total shortest delay time from clock source of fall edge on pin))

Other first period width, second period width, and low level width are computed as follows.

first period width=(first period width at clock source)−((total longest delay time from clock source of rise edge on pin)−(total shortest delay time from clock source of rise edge on pin))

second period width=(second period width at clock source)−((total longest delay time from clock source of fall edge on pin)−(total shortest delay time from clock source of fall edge on pin))

low level width=(low level width at clock source)−((total longest delay time from clock source of fall edge on pin)−(total shortest delay time from clock source of rise edge on pin))

When there are a plurality of clock routes to a pin, and if a signal from a clock source is transmitted without inversion in each route, the high level width of the pin is computed by the above mentioned equation. Thus, each route has a different total delay time computed by (total longest delay time from clock source of rise edge on pin)−(total shortest delay time from clock source of fall edge on pin). Therefore, in the routes in which a signal from the clock source is transmitted without inversion, the route having the largest delay difference computed by (total longest delay time from clock source of rise edge on pin)−(total shortest delay time from clock source of fall edge on pin) can be obtained. The check with the largest delay difference is the severest in timing. Therefore, if there is no problem with the high level width with the total delay difference, then there is no problem also with the other routes.

As described above, there are a total of four types of pulse width check. Therefore, to perform the four types of check, in addition to the above mentioned total delay difference (hereinafter referred to as a first total delay difference), the total delay difference (hereinafter referred to as a second total delay difference) computed by (total longest delay time from clock source of rise edge on pin)−(total shortest delay time from clock source of rise edge on pin), the total delay difference (hereinafter referred to as a third total delay difference) computed by (total longest delay time from clock source of fall edge on pin)−(total shortest delay time from clock source of rise edge on pin), and the total delay difference (hereinafter referred to as a fourth total delay difference) computed by (total longest delay time from clock source of fall edge on pin)−(total shortest delay time from clock source of fall edge on pin) are to be prepared. If the largest delay difference in the above mentioned delay differences in a plurality of routes joining one another on the same pin is selected, the plurality of routes can be synthesized into one route on the severest timing condition. As a result, the number of routes can be reduced with the deterioration of precision of pulse width check avoided. The conditions to be satisfied among a plurality of routes when the plurality of routes join one another on the same pin are listed below. Based on the conditions, the routes can be distinguished from others. The conditions are hereinafter referred to as synthesise conditions.

Synthesise condition 1: same phase when a signal from the clock source immediately before is transmitted Synthesise condition 2: same clock source immediately before A search for a route is carried out by generating an event for each pin while passing control forward pin by pin from the clock source as a starting point as in the above mentioned search for a route. For an event, at least the data indicating whether or not a signal is inverted, and each type of total delay difference (accumulated value of delay difference) for computation of pulse width are generated. Each type of total delay difference is generated by updating each type of total delay difference generated in the event immediately before.

These total delay differences are generated (computed) as follows. In this example, the first through fourth total delay differences generated in the events immediately before are referred to as the first through fourth total delay differences immediately before, and the first through fourth total delay differences generated in the events in the current process are referred to as the first through fourth total delay differences in the current process. In the path connecting pins indicated by the event immediately before, the delay difference computed by subtracting the shortest delay time required in transmission from the fall edge to the fall edge from the longest delay time required in transmission from the rise edge to the rise edge is referred to as a first delay difference, the delay difference computed by subtracting the shortest delay time from the longest delay time required in transmission from the rise edge to the rise edge is referred to as a second delay difference, the delay difference computed by subtracting the shortest delay time required in transmission from the rise edge to the rise edge from the longest delay time required in transmission from the fall edge to the fall edge is referred to as a third delay difference, and the delay difference computed by subtracting the shortest delay time from the longest delay time required in transmission from the fall edge to the fall edge is referred to as a fourth delay difference.

First, when a clock signal is not inverted, that is, when the signal from the clock source is inverted between the event (pin) immediately before and the current event (pin), or not inverted between the events, the first through fourth total delay differences in the current process are computed as follows.

First total delay difference in the current process=(first total delay difference immediately before)+(first delay difference)

Second total delay difference in the current process=(second total delay difference immediately before)+(second delay difference)

Third total delay difference in the current process=(third total delay difference immediately before)+(third delay difference)

Fourth total delay difference in the current process=(fourth total delay difference immediately before)+(fourth delay difference)

When a clock signal is inverted, that is, the phase of the signal from the clock source in the event (pin) immediately before is different from that in the current event (pin), the first through fourth total delay differences in the current process are computed as follows. In this example, in the path connecting pins indicated by the event immediately before, the delay difference computed by subtracting the shortest delay time required in transmission from the fall edge to the rise edge from the longest delay time required in transmission from the fall edge to the rise edge is referred to as a fifth delay difference, the delay difference computed by subtracting the shortest delay time required in transmission from the rise edge to the fall edge from the longest delay time required in transmission from the fall edge to the rise edge is referred to as a sixth delay difference, the delay difference computed by subtracting the shortest delay time required in transmission from the fall edge to the rise edge from the longest delay time required in transmission from the rise edge to the fall edge is referred to as a seventh delay difference, and the delay difference computed by subtracting the shortest delay time from the longest delay time required in transmission from the rise edge to the fall edge is referred to as a eighth delay difference.

First total delay difference in the current process=(third total delay difference immediately before)+(fifth delay difference)

Second total delay difference in the current process=(fourth total delay difference immediately before)+(sixth delay difference)

Third total delay difference in the current process=(first total delay difference immediately before)+(seventh delay difference)

Fourth total delay difference in the current process=(second total delay difference immediately before)+(eighth delay difference)

An example of a search for a route for a pulse width check performed by referring to the above mentioned synthesise conditions 1 and 2 is described below in detail by referring to FIGS. 21, 16, and 17.

Figure 21:
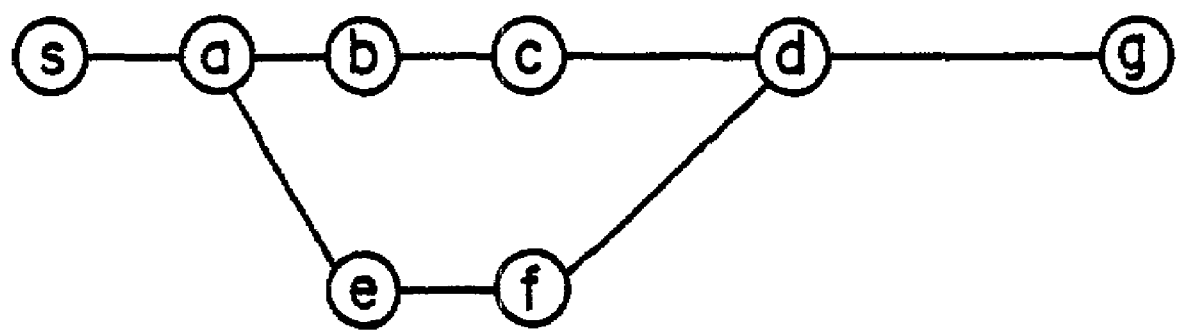
FIG. 21 shows a search for a route for a pulse width check.

In FIG. 21, the clock source is the pin s, and the end point is the pin g. It is assumed that each pin is connected, and no signal inversion occurs in the path. The route s-a-b-c-d-g joins the route s-a-e-f-d-g on the pin d.

The synthesise conditions 1 and 2 are satisfied between the routes s-a-b-c-d-g and s-a-e-f-d-g. Therefore, the largest total delay difference is selected on the pin d by comparing the total delay differences between the routes s-a-b-c-d and s-a-e-f-d. Thus, the routes are synthsized into one route.

In FIG. 16, the clock source is the pin s, and the pin s is connected to the pins a and c. The pin c is connected to the pin a. Therefore, the paths join each other on the pin a.

When the pin c transmits a clock signal in the opposite phase, the synthesise condition 1 is not satisfied between the routes s-a and s-c-a. Therefore, these routes are not grouped into one, but the search for a route is continued to extract the routes.

In FIG. 17, the clock sources are the pins s and c, and the routes s-a-b-c-d-g and s-a-e-f-d-g join each other on the pin d.

On the pin d, the clock source immediately before in the route s-a-b-c-d is the pin c, and the clock source immediately before in the route s-a-e-f-d-g is the pin s. Therefore, since the synthesise condition 2 is not satisfied between the routes, they are not synthsized, the search for a route is continued, and the routes are extracted.

Thus, according to the present embodiment, as in the above mentioned search for a route, a route is searched for, and a plurality of routes are synthsized in one route if they satisfy all the synthesise conditions, thereby reducing the number of routes to be finally extracted with all routes taken into account. As a result of the reduction of the number of routes, an electronic circuit repeating branching and joining can be processed in a high-precision pulse width check in a shorter processing time with a smaller memory capacity.

The above mentioned first through fourth total delay differences are stored for each route remaining on the pin to be processed in the pulse width check. The total delay differences are added to the time of the pulse width corresponding to the clock signal output from the clock source immediately before, thereby computing the pulse width on the pin. Thus, the pulse width check after the search for a route can be quickly performed.

Figure 22:
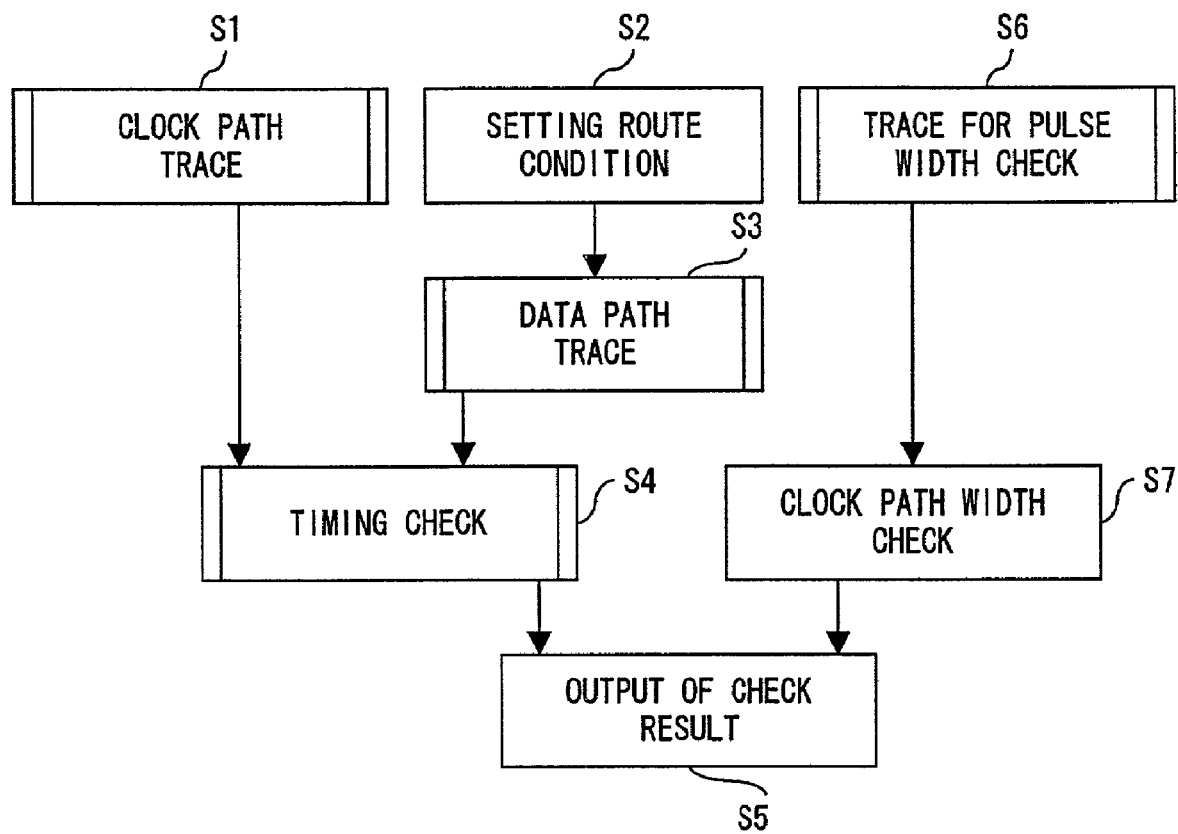
FIG. 22 shows a timing analysis flow.

The above mentioned search for a route and timing analysis are performed along the flow shown in FIG. 22. Then, by referring to FIG. 22, the process performed according to the flow, and the flow itself are described below in detail. The flow shown in FIG. 22 is realized by the CPU 31 shown in FIG. 4 reading the program stored in the storage medium (for example a hard disk) provided in the external storage device 35 when, for example, a user (designer) operates the input device 33, specifies the portion to be timing-analyzed in the electronic circuit, and issues an instruction to analyze the timing.

First, in step S1, one of a plurality of clock routes satisfying all selection conditions is selected, and a clock path is traced using a pin specified as a clock source as a starting point, thereby performing a clock path tracing process for a search for a clock route. In step S2, a route condition to be satisfied by the data route distinguished from others is set. The route conditions can be automatically set based on the type and combination of cells located where an analysis is performed or can be set by a user.

In step S3 after step S2, it is determined whether or not the set route condition is satisfied, and the data path is traced, thereby performing a data path tracing process of searching for a data route. Then, in step S4, a timing check process for carrying out a setup time check and a hold time check is performed on each combination of a clock route extracted in the clock path tracing process in step S1 and a data route extracted in the data path tracing process in step S3. Afterwards, control is passed to step S5 to, for example, instruct the output device 34 to output a check result. By outputting the check result, a series of processes terminates.

In step S6, the tracing process for a pulse width check for a search for a clock route is performed by tracing a clock path while synthesizing a plurality of clock routes depending on whether or not a predetermined synthesise condition is satisfied. When the process is performed, the above mentioned first through fourth total delay differences are computed for each event (pin). Therefore, in the subsequent step S7, the clock pulse width checking process of checking the waveform obtained after transforming the waveform of the clock signal output from the clock source based on the first through the fourth total delay differences is performed for each clock route extracted in the tracing process for the pulse width check in step S6. After the process, control is passed to step S5, and the check result is output by, for example, the output device 34. By outputting the check result, a series of processes terminates.

Described below in detail are various subroutine processes performed according to the timing analysis flow shown in FIG. 22.

Figure 23:
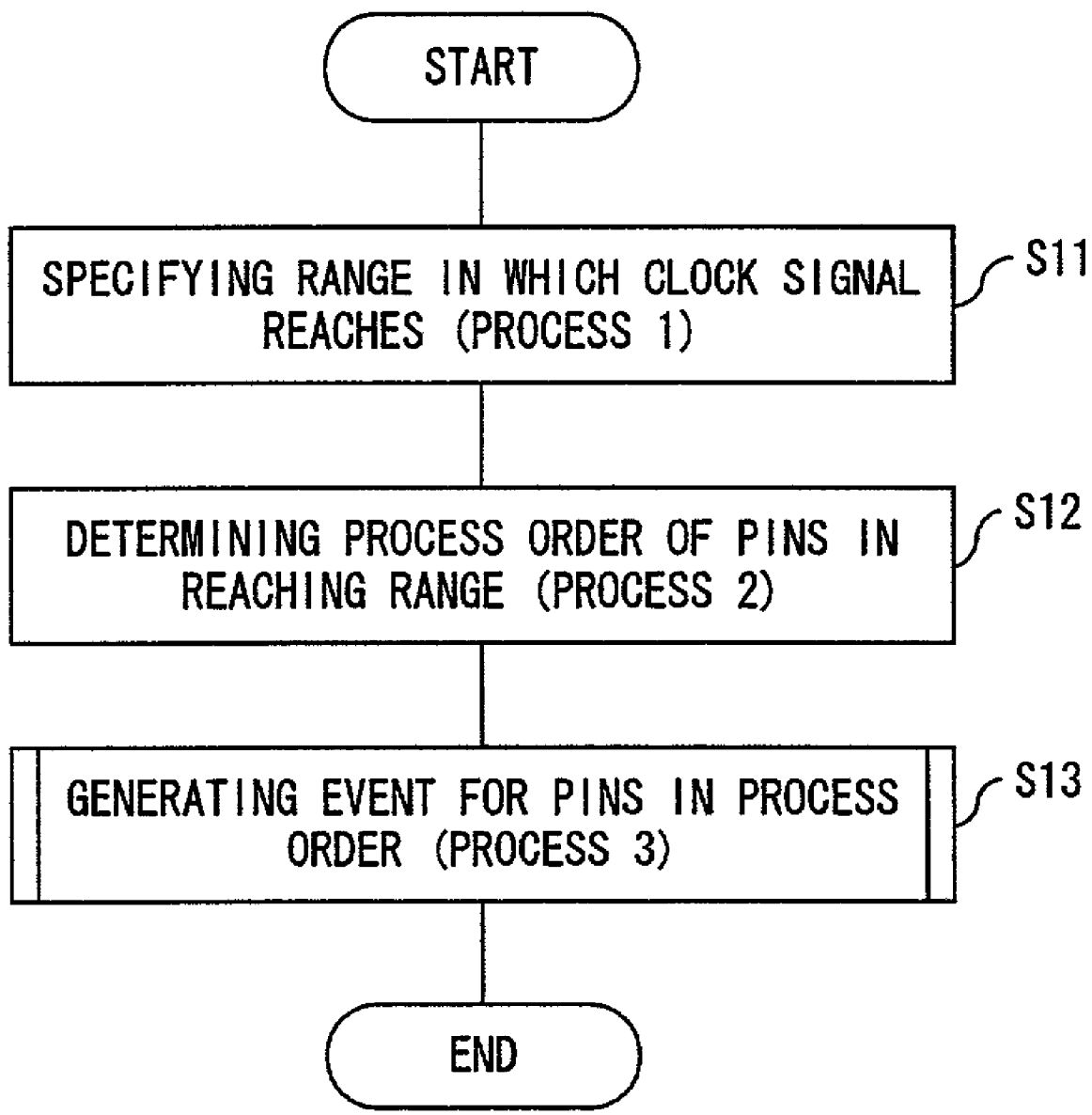
FIG. 23 is a flowchart of the clock path tracing process.

FIG. 23 is a flowchart of the clock path tracing process performed in step S1. Various subroutine processes performed according to the timing analysis flow are described below in detail about the clock path tracing process by referring to FIG. 23.

First, in step S11, a process 1 of specifying in a depth-first search method, etc. a pin within the reach of a clock signal output by a specified clock source as a starting point is performed. Then, in step S12, a process 2 of rearranging specified pins in order from the pin closest to the starting point is performed, thereby setting the process order.

The closeness is determined by the number of pins passed from the starting point to the target pin through the path. That is, the smaller the number is, the closer the pin is set. If there are a plurality of routes to the target pin, the closeness is determined based on the largest number of passed pins in a route. Thus, the process order is determined, and the range and the connection of pins are specified as shown in the graphs in FIGS. 16 through 19.

In step S13 after step S12, a process 3 of generating an event for a pin is performed in the determined process order. Thus, after generating an event for each pin, a series of processes terminates.

By performing the above mentioned clock path tracing process, various types of subroutine processes shown in FIGS. 24 through 28 are performed. Described below in detail are various subroutine processes.

Figure 24:
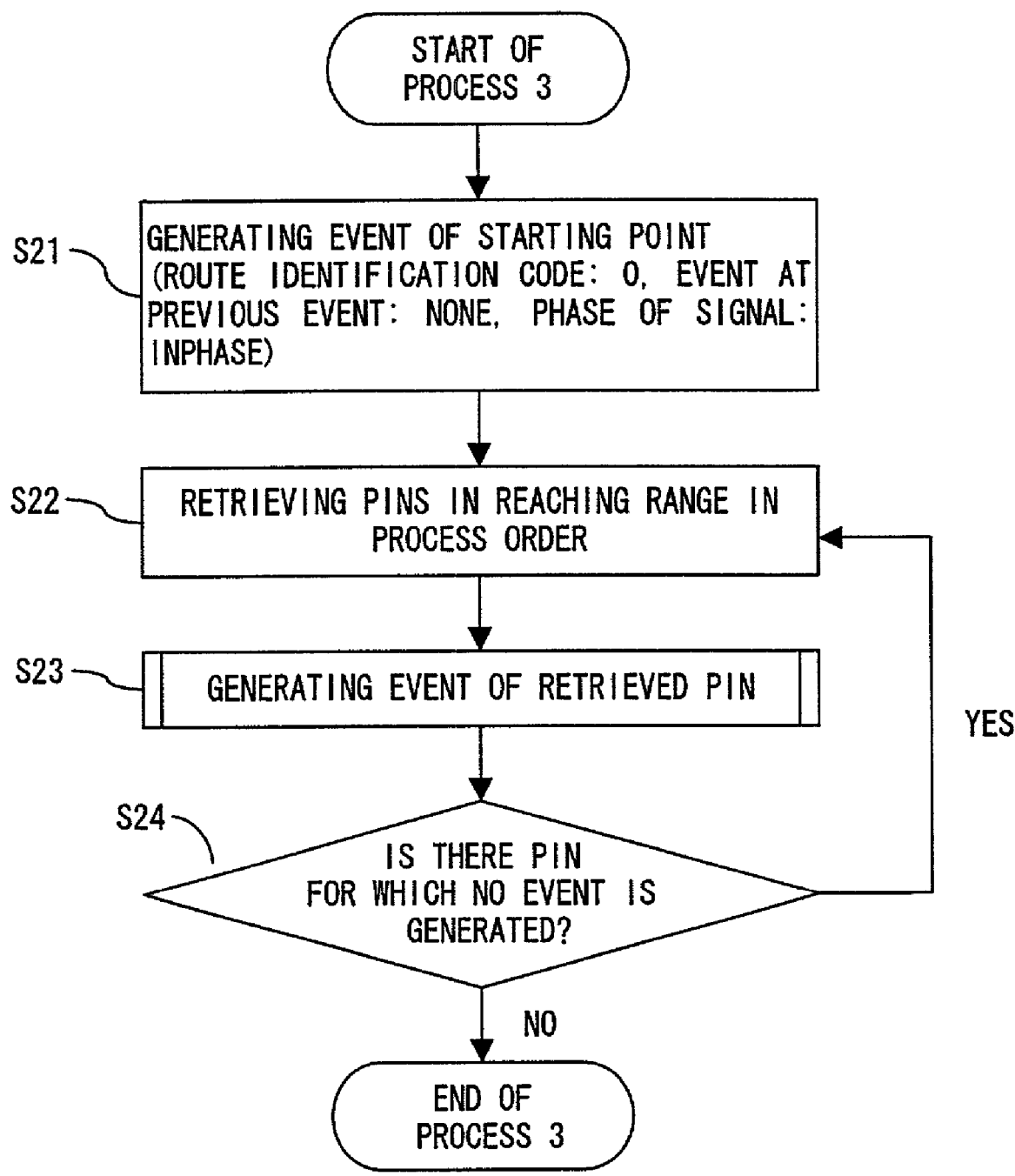
FIG. 24 is a flowchart of the process 3.

FIG. 24 is a flowchart of the process 3 performed as step S13. Various subroutine processes are described first by referring to FIG. 24.

First, in step S21, since the pin (event) of the starting point is not preceded by the pin (event) immediately before, it is generated as distinguished from the other pins. The event is an information table generated as associated with a pin. In this example, the information table stores a total delay time along a route, the event name which indicates the data of the preceding event, the event name as the data indicating the clock source immediately before, the data indicating the phase in transmission of a signal from the clock source immediately before, the route identification code, etc. Since the starting pin is not preceded by an event, the value of the route identification code is 0, and it stores the data about the absence of a preceding event, and the data indicating the inphase signal.

The total delay time stored in the information table depends on the set mode. The mode can be either a mode (hereinafter referred to as a longest delay time for convenience) in which the longest delay time of a path is added, or a mode (hereinafter referred to as a shortest delay time for convenience) in which the shortest delay time is added. The detailed explanation is omitted here, but the process 3 can be performed twice in different modes by switching the modes. In this example, to avoid the confusion, the explanation with the current mode taken into account is minimized. The delay time of the path can be obtained by referring to the library and the wiring length database stored in the storage medium (for example, a hard disk) provided for the external storage device 35.

In step S22 after step S21, a pin within the reach is retrieved according to the process order determined in step S12 shown in FIG. 23. In the next step S23, the process of generating an event of a retrieved pin is performed. Afterwards, control is passed to S24.

In step S24, it is determined whether or not there is a pin for which no event has been generated. When events are generated for all pins with all routes taken into account, the determination is NO, thereby terminating a series of processes. Otherwise, the determination is YES, control is returned to step S22, and the subsequent processes are performed.

The process loop formed in steps S22 through S24 is repeatedly performed until the determination in step S24 is NO. Thus, as described above by referring to FIGS. 9A through 12B, one or more events are generated for each pin.

Figure 25:
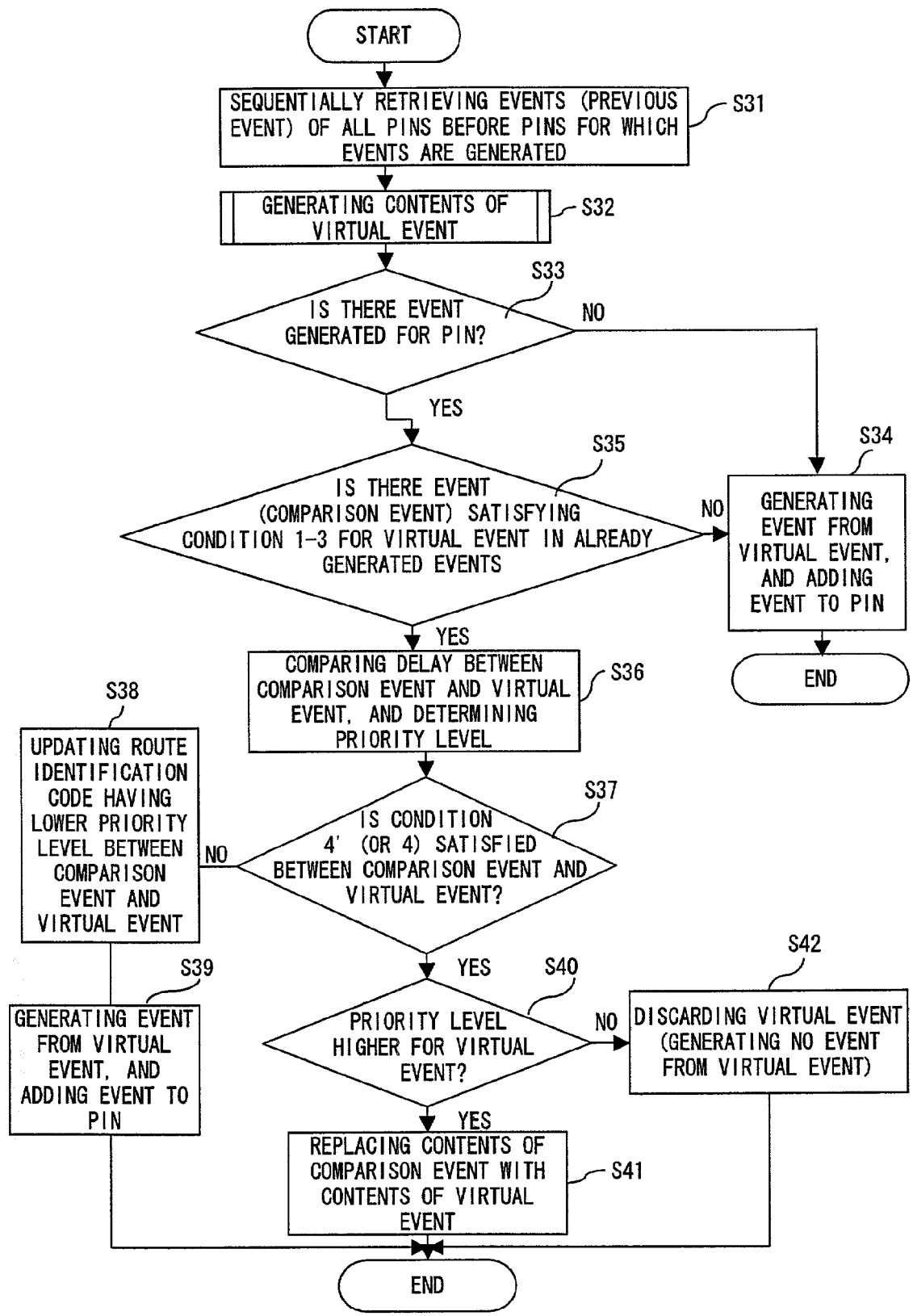
FIG. 25 is a flowchart of the pin event generating process.

FIG. 25 is a flowchart of the process of generating an event for a pin performed in step S23. Then, by referring to FIG. 25, the event generating process is described in detail.

First, in step S31, the events for all pins preceding the pin being processed are sequentially retrieved. In the subsequent step S32, the contents of the event when a signal is transmitted from the retrieved preceding event to the pin is generated in a temporary area (the area reserved in the memory 32, or the external storage device 35), and a process of generating the contents of a virtual event whose contents have been generated is performed. Afterwards, control is passed to step S33.

In step S33, it is determined whether or not there is an event generated for a pin to be processed. If there are a plurality of events generated for a pin to be processed including the virtual event generated in step S32, the determination is YES, and control is passed to step S35. Otherwise, that is, if no event is generated for the pin to be processed, and one virtual event has been generated, then the determination is NO, control is passed to step S34, the generate virtual event is added to the pin as an event, and a series of processes terminates.

On the other hand, in step S35, it is determined whether or not there is an event (hereinafter referred to as a comparison event) satisfying the selection conditions 1 through 3 for a virtual event in the already generated events. If a plurality of routes satisfying the selection conditions 1 through 3 do not join one another on the pin to be processed, then the determination is NO, control is passed to step S34, the virtual event is added to the pin as an event, and a series of processes terminates. Otherwise, the determination is YES, and control is passed to step S36.

If a plurality of events for the preceding pin have been retrieved in step S31, then a plurality of virtual events are generated. Thus, in step S35, it is similarly determined whether or not there is a virtual event satisfying the selection conditions 1 through 3 among the virtual events. If a plurality of virtual events satisfy the selection conditions 1 through 3, one or more of the virtual events are processed as comparison events. Therefore, among the already generated events, all of the selection conditions 1 through 3 and 4' (or 4) are not satisfied.

In step S36, the total delay times are compared between the comparison event and the virtual event to determine a priority level. A higher priority level is assigned to a comparison event or a virtual event whichever has a longer total delay time in the largest delay mode, and the opposite in the smallest delay mode. After determining the priority level, control is passed to step S37.

In step S37, it is determined whether or not the selection condition 4' (or 4) is satisfied between the comparison event and the virtual event. If the selection condition 4' (or 4) is satisfied in the delay time of the section from the pin on which a route branches immediately before it is specified by tracing the route by referring to the condition table of each event to the pin currently being processed, then the determination is YES, and control is passed to step S40. Otherwise, the determination is NO, and control is passed to step S38.

In step S38, since a one route is not selected form plurality of routes joining one another on the pin to be processed, the route identification code of the comparison event or the virtual event whichever has a lower priority level is updated and set as a non-existing value. In the subsequent step S39, a virtual event is added to the pin to be processed as an event, thereby terminating a series of processes.

In step S40, it is determined whether or not a virtual event is assigned a higher priority level. If the virtual event is assigned a higher priority level, the determination is YES, the contents of the virtual event are replaced with the contents of the comparison event in step S41, that is, the route containing the comparison event is discarded, thereby terminating a series of processes. Otherwise, the determination is NO, the contents of the virtual event are discarded in step S42, that is, the route in which the virtual event is generated is discarded to the route containing the comparison event, thereby terminating a series of processes.

Thus, according to the present embodiment, a one route assigned the highest priority level is selected from a plurality of routes satisfying the selection conditions 1 through 3, 4', or 1 through 4.

FIG. 26 is a flowchart of the contents generating process of the virtual event performed in step S32. Described below in detail is the contents generating process.

First, in step S51, a process of determining the value of the route identification code and the clock source immediately before is performed. In the subsequent step S52, the process of determining the phase for transmission of a signal from the clock source immediately before. Then, control is passed to step S53, and the process of setting the preceding event, a total delay time of a route, etc. is performed, thereby terminating a series of processes.

In steps S51 through S53, the processes are performed for each virtual event. Therefore, the data indicating the contents of a virtual event is temporarily stored in an area.

In steps S51 and S52, the processes of the following contents are performed.

FIG. 27 is a flowchart of the process of determining the route identification code used as the above mentioned step S51, and the clock source immediately before. First, the determining process is described in detail by referring to FIG. 27.

In step S61, it is determined whether or not the pin having the preceding event is a clock source other than the starting point. If the pin is a clock source other than the starting point, the determination is YES, and control is passed to step S62. Otherwise, the determination is NO, and control is passed to step S63. It is determined whether or not a pin is a clock source by referring to a library or a net list.

In step S62, since the pin immediately before is a clock source other than the starting point, a value not set yet is set as a route identification code, and the event name of the clock source is set as the name of an event indicating the clock source immediately before. Thus, after setting (determining) the event name indicating the route identification code and the clock source immediately before, a series of processes terminates.

In step S63, since the pin immediately before is not a clock source other than the starting point, the names of the preceding events are set as the event names indicating the route identification code and the clock source immediately before. Thus, after setting (determining) the event names indicating the route identification code and the clock source, a series of processes terminates.

Figure 28:
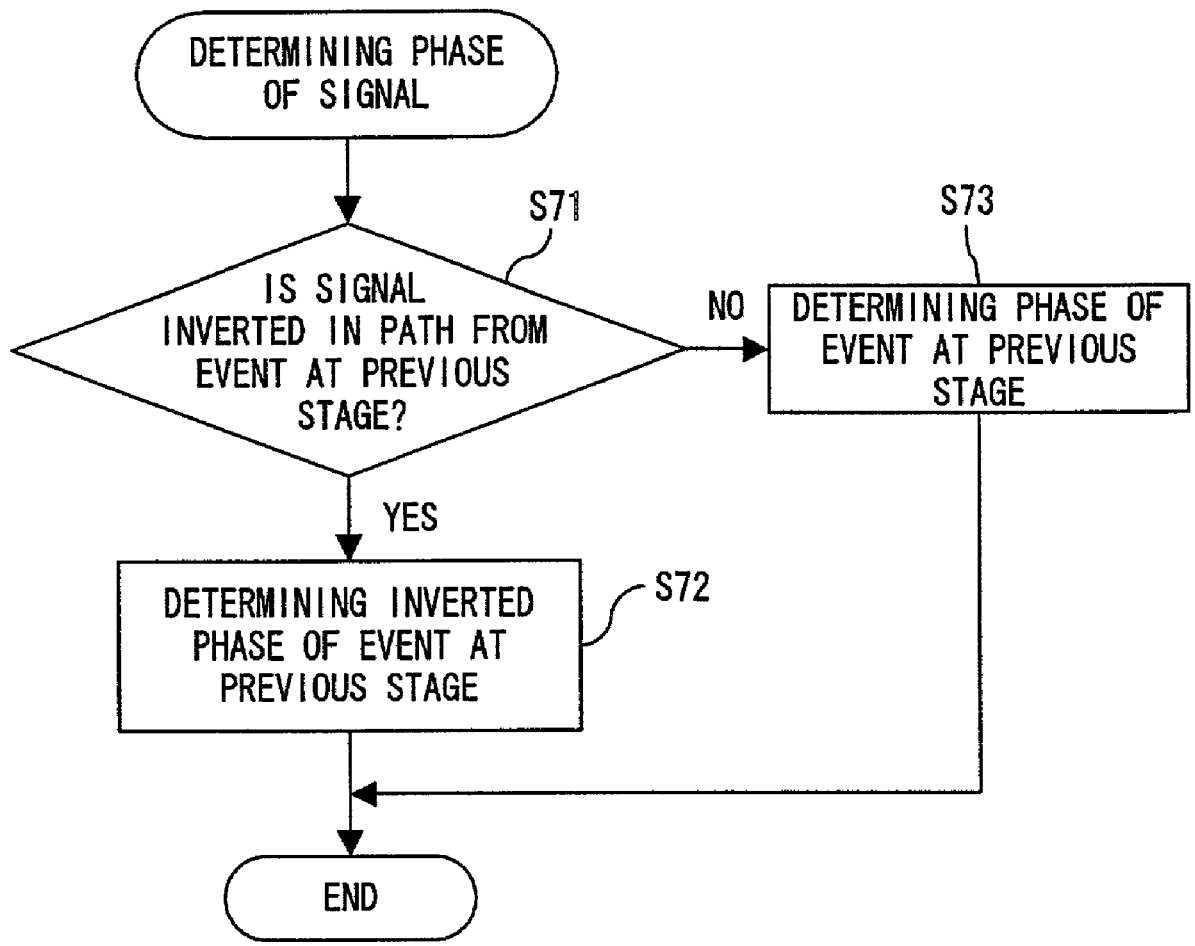
FIG. 28 is a flowchart of the reciprocal determination process for transmission of a signal.

The process of determining the phase in transmission of a signal performed in step S52 in the flowchart shown in FIG. 26 is described below in detail by referring to the flowchart shown in FIG. 28.

In step S71, it is determined whether or not a signal is inverted between the pin having the preceding event and the path. For example, it is confirmed that the signal is inverted between the library and the path, the determination is YES, control is passed to step S72, and it is determined that the phase of the signal in transmission is inverted from the phase of the signal in transmission in the preceding event, thereby terminating a series of processes. Otherwise, that is, if the signal is not inverted or if the pin having the event immediately before is a clock source, then the determination is NO, control is passed to step S73, and it is determined that the phase of the signal in transmission is the same as the phase of the signal in transmission in the preceding event, thereby terminating a series of processes. If the pin having the event immediately before is a clock source, the inphase determination is performed.

In the clock path tracing process performed in step S1 in the analysis flow shown in FIG. 22, the above mentioned various subroutine processes are performed. Thus, the clock routes used in performing a timing analysis such as a setup time check, a hold time check, etc. can be extracted by mode.

Figure 29:
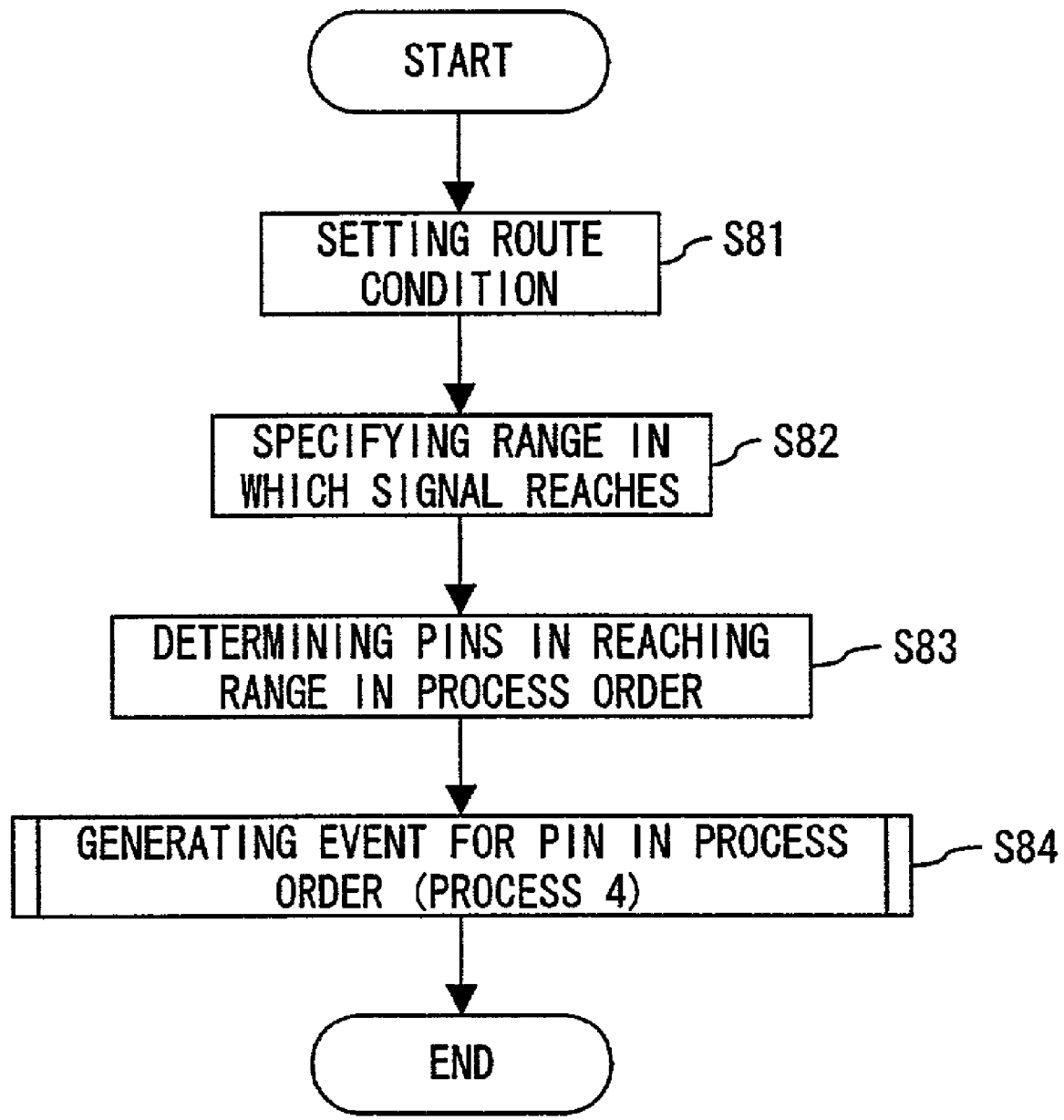
FIG. 29 is a flowchart of the data path tracing process.

FIG. 29 is a flowchart of the data path tracing process performed in step S3 in the timing analysis flow shown in FIG. 22. The tracing process is described below in detail by referring to FIG. 29.

First, in step S81, a preprocess of adding a flag to a pin (starting point, end point, specific pin, etc.) specified in the route condition set in step shown in FIG. 22 is performed (refer to FIGS. 7 and 8). Then, in step S82, a process of specifying a pin within the reach of the data signal output from the pin specified as a starting point in a depth prioritized search method, etc. In the subsequent step S83, pins in the specified range are rearranged in order from the pin closest to the starting point, thereby setting the process order.

The contents of the above mentioned steps S82 and S83 are the same as those of the process 1 in step S11 and the process 2 in step S12 shown in FIG. 23. By performing the process in step S83, the reach of the data signal and the connection of the pin can be designated.

In step S84 subsequent to step S83, the process 4 of generating an event for a pin is performed in a determined process order. Thus, after generating an event for each pin, a series of processes terminates.

By performing the above mentioned data path tracing process, various subroutine processes are performed as shown in FIGS. 24 through 28. Described below in detail are various subroutine processes.

Figure 30:
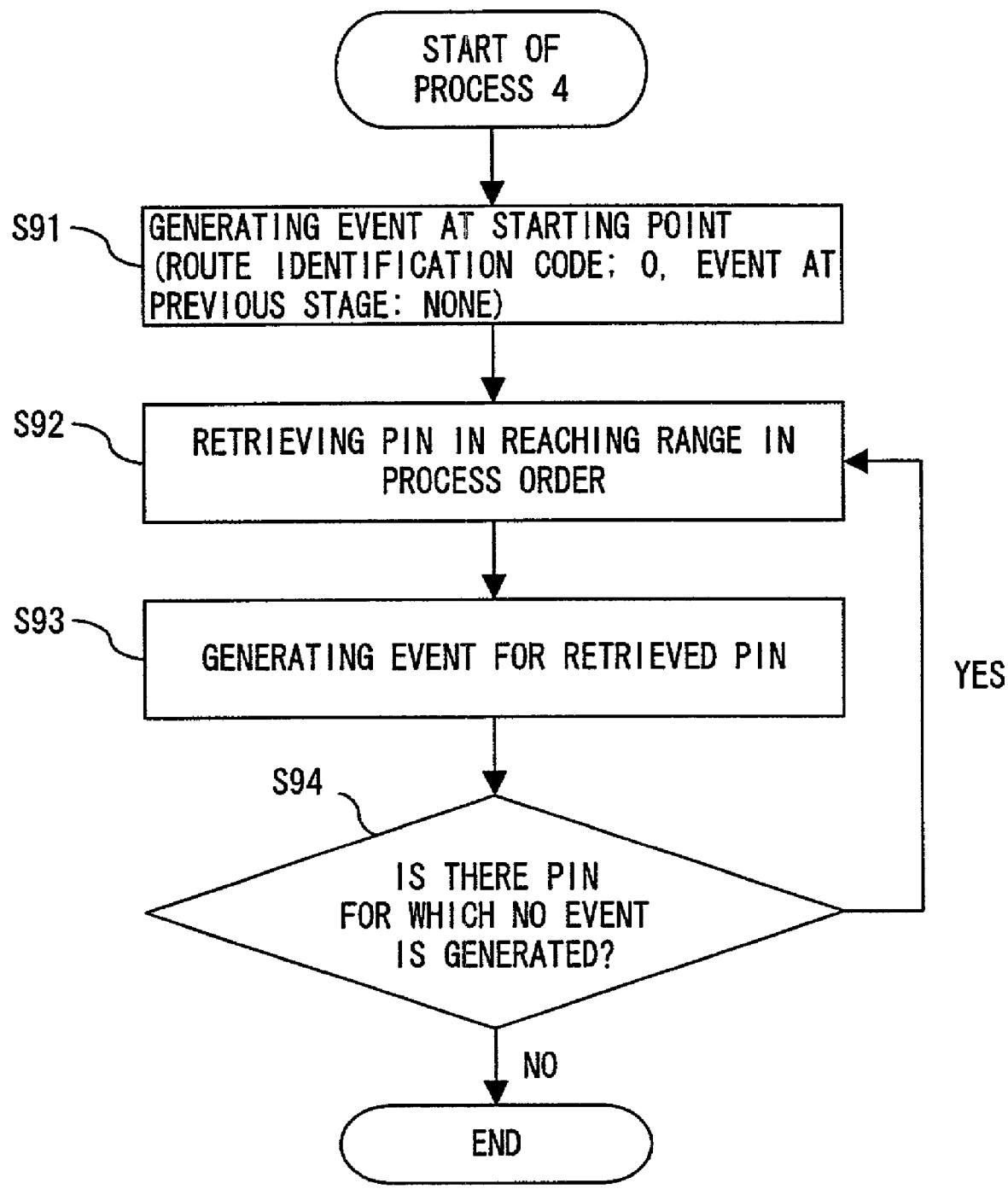
FIG. 30 is flowchart of the process 4.

FIG. 30 is a flowchart of the process 4 performed as the above mentioned step S84. In the various subroutine processes, the process 4 is described in detail by first referring to FIG. 30.

In step S91, since the starting point pin has no preceding pin (event), an event is generated independent of other pins. In this example, an information table, which is the event of the starting point pin, stores a total delay time along the route, an event name which is the data indicating the preceding event, a route identification code, etc. Since the starting point pin has no preceding event, the value of the route identification code is 0, the information that there is no preceding event is stored, and the total delay time is 0.

The total delay time stored in the above mentioned information table is stored twice when modes are switched as in the process 3. To avoid the confusion, the explanation with the current mode taken in account is minimized. The delay time of a path can be obtained by referring to the library or the wiring length database stored in the storage medium (for example, a hard disk) provided in, for example, the external storage device 35. The two modes can be the largest delay mode and the smallest delay mode as in the process 3.

In step S92 subsequent to step S91, the pin within the reach is retrieved in the process order determined in step S83. In the subsequent step S93, the process of generating an event of the retrieved pin is performed. Then, control is passed to step S94.

In step S94, it is determined whether or not there is a pin for which an event is not generated. When events are generated for all pins with all routes taken into account, the determination is NO, and a series of processes terminates. Otherwise, the determination is YES, control is returned to step S92, and the subsequent processes are similarly performed.

The process loop formed in steps S92 through S94 is repeatedly performed until the determination in step S94 is NO. Therefore, one or more events are generated for each pin as described above by referring to FIGS. 9A through 12B.

Figure 31:
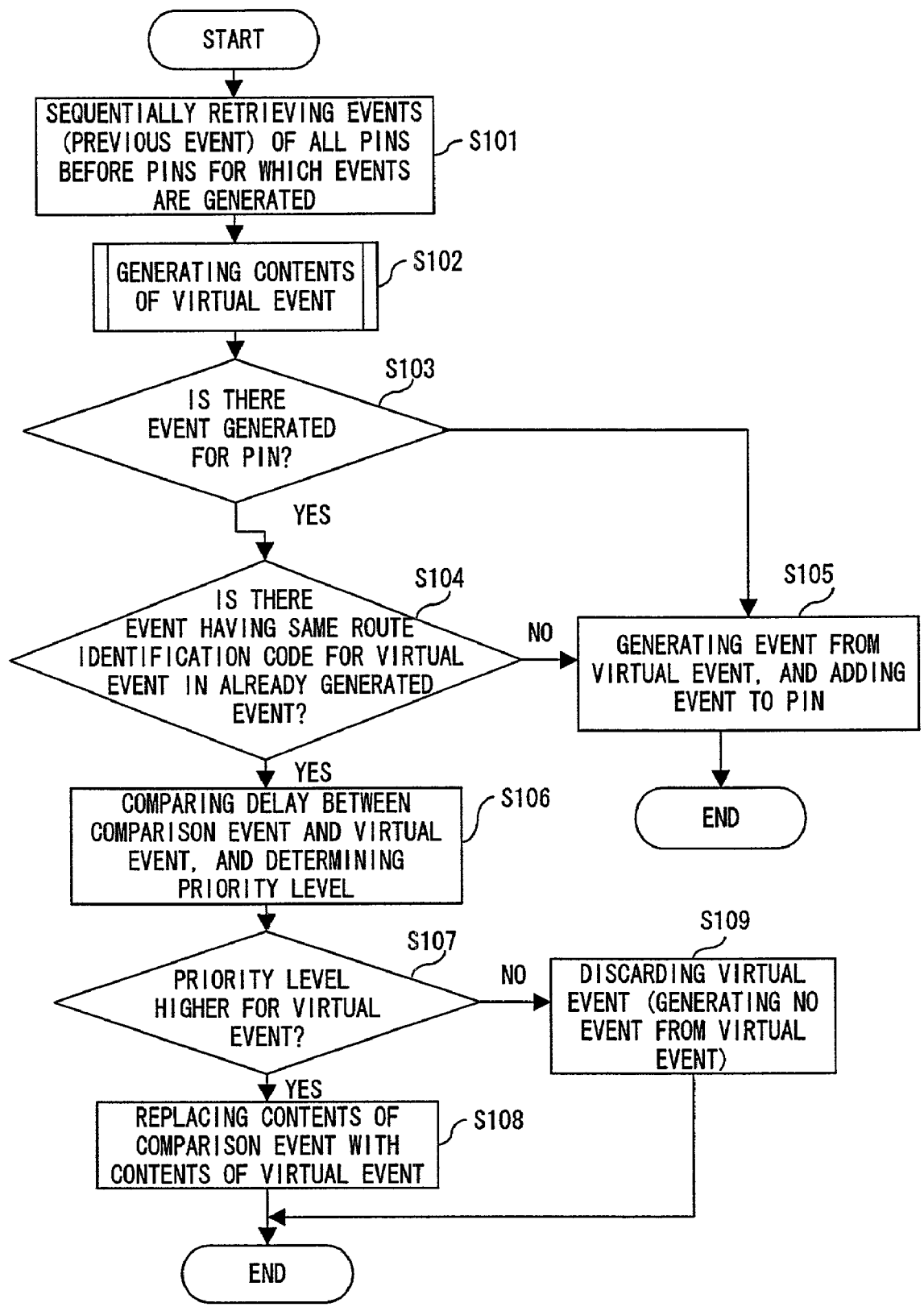
FIG. 31 is a flowchart of the pin event generating process in the process 4.
Figure 33:
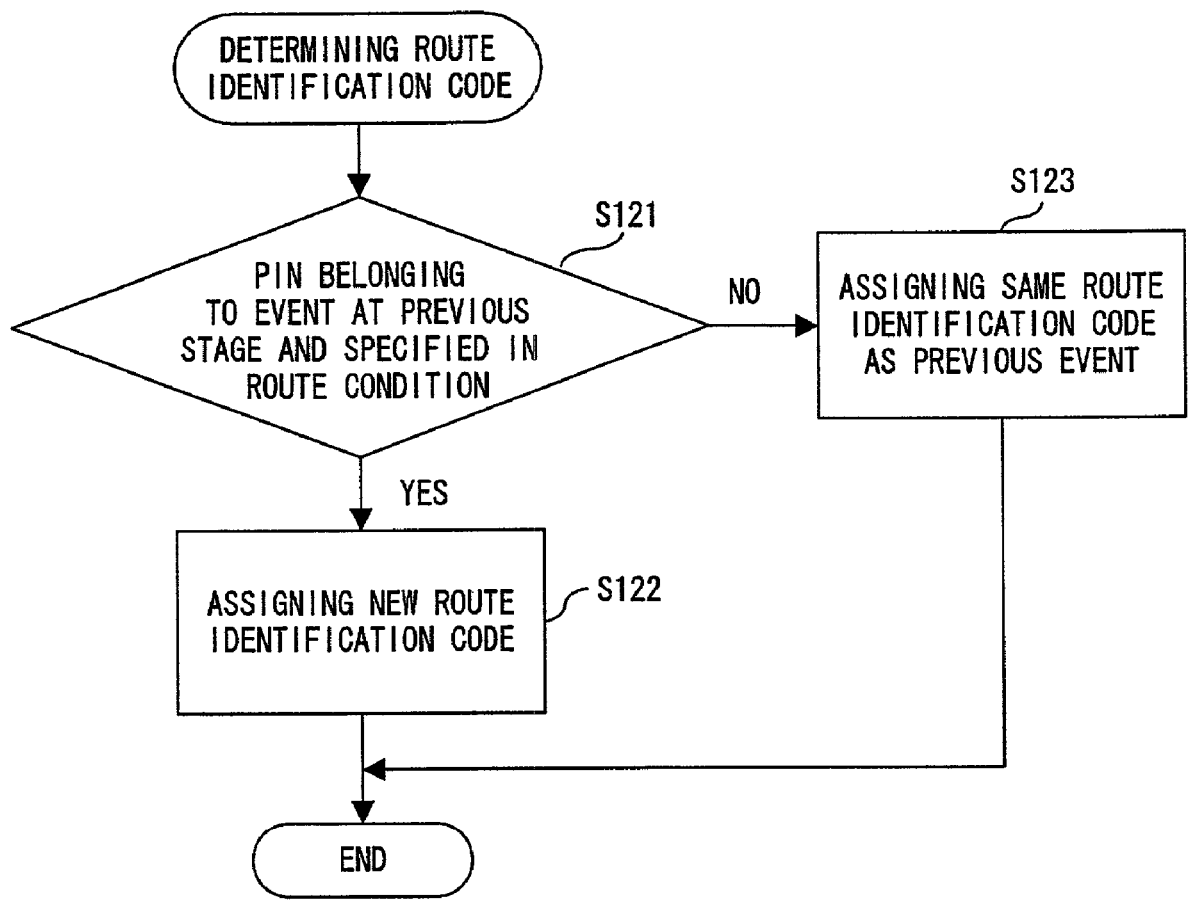
FIG. 33 is a flowchart of the route identification code determination process.

FIG. 31 is a flowchart of the event generating process performed as the above mentioned step S93. Next, the event generating process is described below in detail by referring to FIG. 31.

First, in step S101, the events of all pins before the pin being processed are sequentially retrieved. In the subsequent step S102, the contents of the event when a signal is transmitted from the retrieved preceding event to the pin are generated in a temporary area (the area reserved in the memory 32, or the external storage device 35), and a process of generating the contents of a virtual event whose contents have been generated is performed. Afterwards, control is passed to step S103.

In step S103, it is determined whether or not there is an event generated for a pin to be processed. If there are a plurality of events generated for a pin to be processed including the virtual event generated in step S102, the determination is YES, and control is passed to step S104. Otherwise, that is, if no event is generated for the pin to be processed, and one virtual event has been generated, then the determination is NO, control is passed to step S105.

In step S104, it is determined whether or not there is an event (hereinafter referred to as a comparison event) having the same value of the route identification code for a virtual event in the already generated events. If a plurality of routes having different values of route identification codes do not join one another on the pin to be processed, then the determination is NO, control is passed to step S105, the virtual event is added to the pin as an event, and a series of processes terminates. Otherwise, the determination is YES, and control is passed to step S106.

If a plurality of events for the preceding pin have been retrieved in step S101, then a plurality of virtual events are generated. Thus, in step S104, it is similarly determined whether or not there is a virtual event having the same value of route identification code among the virtual events. If a plurality of virtual events have the same values of route identification codes, one or more of the virtual events are processed as comparison events. Therefore, among the already generated events, the values of the route identification codes do not match one another (refer to FIG. 11B or 12B).

In step S106, the priority level is determined by comparing the total delay times between a comparison event and a virtual event. A higher priority level is assigned to a comparison event or a virtual event whichever has a longer total delay time in the largest delay mode, and the opposite in the smallest delay mode. After determining the priority level, control is passed to step S107.

In step S107, it is determined whether or not a virtual event is assigned a higher priority level. If the virtual event is assigned a higher priority level, the determination is YES, the contents of the virtual event are replaced with the contents of the comparison event in step S108, that is, the route containing the comparison event is abandoned, thereby terminating a series of processes. Otherwise, the determination is NO, the contents of the virtual event are discarded in step S109, that is, the route in which the virtual event is generated is abandoned, thereby terminating a series of processes.

Thus, according to the present embodiment, a one route assigned the highest priority level at the stage of generating an event for the junction pin is selected from a plurality of routes having the same values of route identification codes.

FIG. 32 is a flowchart of the process of generating the contents of a virtual event performed as the above mentioned step S102. Described below in detail is the content generating process.

In step S111, the route identification code determining process for determination of the value of the route identification code is performed. In the subsequent step S112, the process of setting the preceding event and the total delay time of a route is performed, thereby terminating a series of processes.

FIG. 32 is a flowchart of a route identification code determining process performed as the above mentioned step S111. The determining process is described in detail by referring to FIG. 32.

In step S121, it is determined whether or not the pin having the preceding event is a pin specified in the set route condition. As described above, a pin specified in a route condition is assigned a flag. Therefore, if a pin is assigned a flag, the determination is YES, and control is passed to step S122. Otherwise, the determination is NO, and control is passed to step S123.

Since the preceding pin is assigned a flag in step S122, a non-existing value is set to a route identification code. In step S123, the value of the route identification code of the preceding event is set as a value of the route identification code. Thus, a route identification code having a non-existing value, or a route identification code having the same value as the preceding event is set, thereby terminating a series of processes.

In the data path tracing process performed as the step S3 in the timing analysis flow shown in FIG. 22, the above mentioned various subroutine processes are performed. Thus, a data route used in performing a timing analysis such as a setup time check, a hold time check, etc. is extracted by mode with the discrimination by set route condition.

Figure 34:
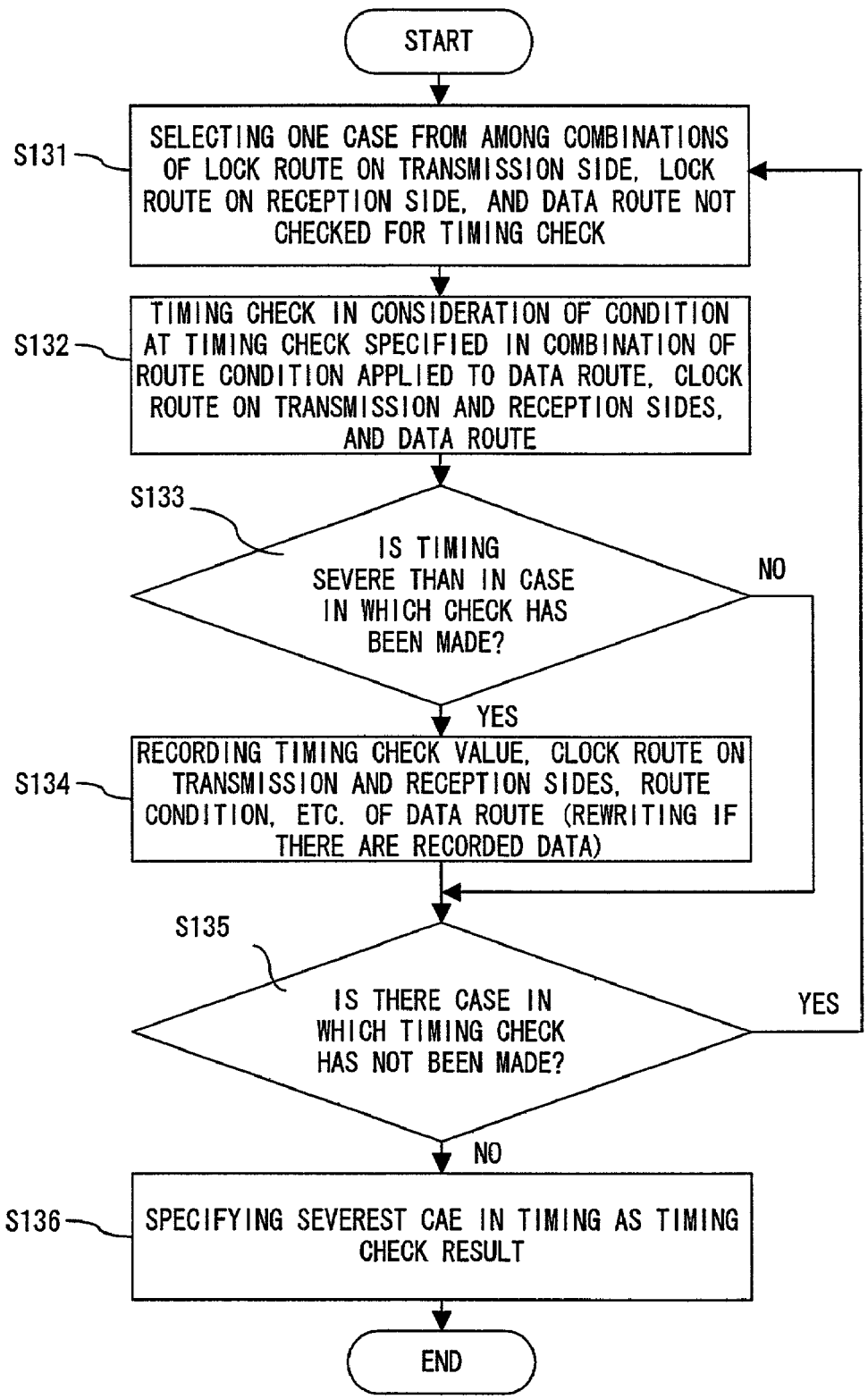
FIG. 34 is a flowchart of the timing check process.

The timing check process in step S4 of the timing analysis flow is performed after the clock path tracing process in step S1 and the data path tracing process in step S3 are performed. The timing check process is described below in detail by referring to the flowchart shown in FIG. 34.

As described above, in the timing analysis, it is necessary to check all possible combinations of the route to the clock pin of the cell on the data signal transmission side, the route to the clock pin of the cell on the data signal reception side, and the route for transmission of the data signal. Therefore, in the timing check process, the combination of the selected routes are sequentially changed and used in the timing check.

First, in step S131, a combination on which a timing check has not been carried out is selected from the combinations of the route to the clock pin of the cell on the data signal transmission side, the route to the clock pin of the cell on the data signal reception side, and the route for transmission of the data signal. In this example, the selected combination is referred to as a case.

In step S132 subsequent to step S131, a timing check is carried out with the conditions of the timing check specified by the route condition satisfied by the data route of the case and the combination of the clock routes to each of the cells on the transmission and reception sides. Then, control is passed to step S133.

In step S133, it is determined whether or not the currently checked case is severer in timing than the previously checked case. If the currently checked case is the worst of all, the determination is YES, control is passed to step S134, the case, the value obtained in the case, the route condition satisfied by the data route, etc. are recorded, and control is passed to step S135. When they are recorded, the data already recorded is overwritten. Otherwise, the determination is NO, and control is passed to step S135.

In step S135, it is determined whether or not there is a combination on which a timing check has not been carried out. If the timing check has been carried out on all combinations, then the determination is NO, control is passed to step S136, the severest case in timing in the recorded data, the value obtained in the timing check, the route condition satisfied by the data route, etc. are specified as a check result, thereby terminating a series of processes. Otherwise, the determination is NO, control is returned to step S131, and another case is selected from the combinations of routes.

In step 5 shown in FIG. 22 performed after the above mentioned timing check process, the check result specified in step S136 is output on the output device 34, etc. Thus, a user is informed of the result of the timing check.

Normally, there are a plurality of combinations of a cell on the transmission side and a cell on the reception side. A cell on the reception side can also be a cell on the transmission side. Therefore, the above mentioned timing check process is performed for each of the combinations although the detailed explanation is omitted here.

Figure 35:
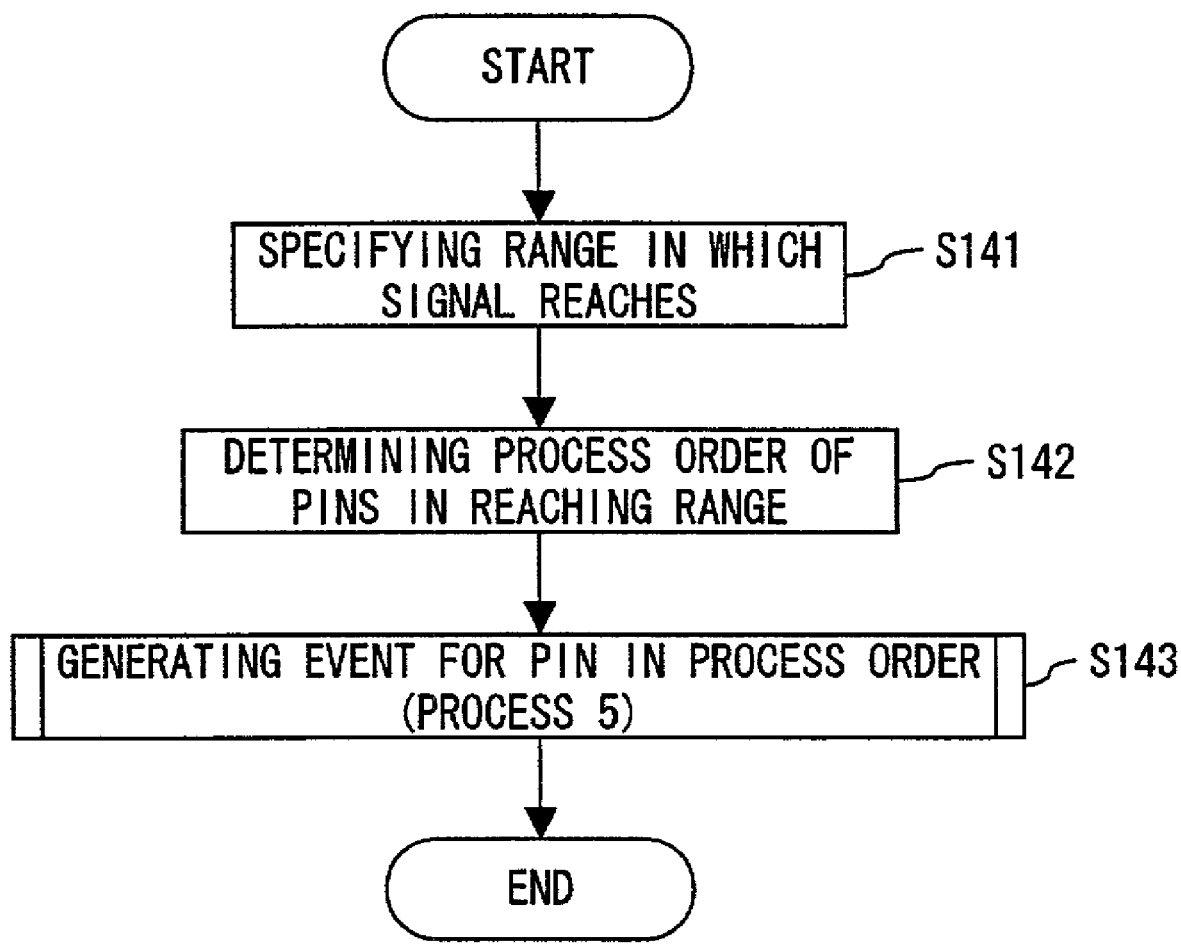
FIG. 35 is a flowchart of the tracing process for a pulse width check.

FIG. 35 is a flowchart of the tracing process for a pulse width check performed as the step S6 in the timing analysis flow shown in FIG. 22. The tracing process is described below in detail by referring to FIG. 35.

In step S141, the process of specifying a pin within the reach of the clock signal output from the clock source specified as a starting point in a depth prioritized searching method, etc. is performed. The subsequent step S142, the pins in the specified range are rearranged from the pin closest to the starting point, thereby setting the process order.

In step S143 subsequent to step S142, the process 5 of generating an event for a pin in the determined process order is performed. Thus, after generating an event for each pin, a series of processes terminates.

FIG. 36 is a flowchart of the process 5 performed as the above mentioned step S143. The process 5 is described below in detail by referring to FIG. 36.

First, in step S151, since the starting point pin has no preceding pin (event), an event is generated independent of other pins. In this example, an information table, which is the event of the starting point pin, stores an event name which is the data indicating the preceding event, an event name which is the data indicating the clock source immediately before, data indicating the phase for transmission of a signal, the first through fourth total delay differences, etc. Since the starting point pin has no preceding event, the information that there is no preceding event, the information that the event name which is data indicating the clock source immediately before, the data indicating the same phase, and the first through fourth total delay differences of 0 are stored.

In step S152 subsequent to step S151, the pin within the reach is retrieved in the process order determined in step S142 shown in FIG. 35. In the subsequent step S153, the process of generating an event of the retrieved pin is performed. Then, control is passed to step S154.

In step S154, it is determined whether or not there is a pin for which an event is not generated. When events are generated for all pins with all routes taken into account, the determination is NO, and a series of processes terminates. Otherwise, the determination is YES, control is returned to step S152, and the subsequent processes are similarly performed.

The process loop formed in steps S152 through S154 is repeatedly performed until the determination in step S154 is NO. Therefore, one or more events are generated for each pin as in the search for other routes.

FIG. 37 is a flowchart of the event generating process performed as the above mentioned step S153. Next, the event generating process is described below in detail by referring to FIG. 37.

First, in step S161, the events of all pins before the pin being processed are sequentially retrieved. In the subsequent step S162, the contents of the event when a signal is transmitted from the retrieved preceding event to the pin are generated in a temporary area (the area reserved in the memory 32, or the external storage device 35), and a process of generating the contents of a virtual event whose contents have been generated is performed. Afterwards, control is passed to step S163.

In the above mentioned process of generating the contents of a virtual event, the event name indicating the preceding event, the event name indicating the clock source immediately before, and the phase in transmission of a signal from the clock source immediately before are determined for each of the precedent events, and the first through fourth total delay differences are computed. The determination of the clock source immediately before and the phase of the signal is performed as in process of generating the contents of the virtual event shown in FIG. 26. The first through fourth total delay differences are computed by first obtaining the first through fourth delay differences or the fifth through eighth delay differences depending on the determined phase, and by adding the obtained delay differences to one of the first through fourth total delay differences of the precedent event.

In step S163, it is determined whether or not there is an already generated event for the pin to be processed. If there are a plurality of events generated for the pin to be processed including the virtual event generated in step S162, the determination is YES, and control is passed to step S164. Otherwise, that is, if no event is generated for a pin to be processed, and if only one virtual event is generated, then the determination is NO, and control is passed to step S166.

In step S164, it is determined whether or not there are the same clock source immediately before and the same phase of a signal from the clock source between the already generated events and the virtual event. If a plurality of routes satisfying the synthesise conditions 1 and 2 join one another on the pin to be processed, then the determination is YES, and control is passed to step S164. Otherwise, the determination is NO, and control is passed to step S166.

If a plurality of events for the precedent pin are retrieved in step S161, then a plurality of virtual events are generated. Thus, in step S164, it is also determined as to whether or not there are routs satisfying the synthesise conditions 1 and 2 among virtual events. Thus, routes satisfying the synthesise conditions 1 and 2 are avoided among the already generated events.

In step S165, the first through fourth total delay differences are compared among the events satisfying the synthesise conditions 1 and 2, and the first through fourth total delay differences of one of the events are rewritten into the largest total delay difference among them. Thus, the plurality of routes satisfying the synthesise conditions 1 and 2 are synthesized, thereby terminating a series of processes. In step S166, a virtual event is added as an event to a pin. Then, a series of processes is terminated.

As described above, according to the present embodiment, a data path for a search for a route is traced while computing the first through fourth total delay differences for use in computing the pulse width. A plurality of routes satisfying the synthesise conditions 1 and 2 are synthesized when an event for the junction pin is generated.

After performing the tracing process for a pulse width check in step S6 shown in FIG. 22, the clock pulse width check process in step S7 is performed.

In the pulse width checking process, the process is performed on the pulse width transformed from each type of pulse width of a clock signal output from the clock source immediately before by using the final first through fourth total delay differences for each route so that the route having the worst pulse width, each type of pulse width, etc. are specified as check results. The check results are output on the output device 34, etc. when the subsequent process in step S5 is performed, thereby notifying the user of the result of the pulse width check.

According to the present embodiment, a search for a route is carried out by referring to one of the predetermined route condition, selection condition, and synthesise condition. However, plural types of the conditions can be referred to in a search for a route. Practically, for example, the route condition and the selection condition, or the route condition and the synthesise condition can be combined, and a search for a route can be carried out by referring to the combined condition. Plural combinations can be prepared using the selection condition and the synthesise condition to join a plurality of routes.

A search for a data route and a clock route for use in a timing analysis is carried out by mode, but it is not limited to a search by mode. When it is not carried out by mode, a plurality of routes satisfying respective conditions can join one another on the same pin. In this case, one or more routes are selected from among a plurality of routes satisfying the conditions.

The present embodiment simulates a search for a route, and a timing analysis and a waveform analysis using the result of the search. The simulation can be performed by receiving a result of a route search from an external device. To attain this, the present invention can be applied to a device for searching for a route (route search device).

The above mentioned simulation (timing analysis, waveform analysis, etc.) or a program for realizing a search for a route is not stored in the storage medium provided in the external storage device 35, but can be recorded in a portable recording medium SM such as CD-ROM, DVD, a magneto-optical disk, etc. A part or all of the program can be distributed through a transmission medium used in a public network, a LAN, etc. In this case, a user can obtain a program and load it into a computer (data processing device) to which the present invention is applied. Thus, the storage medium can be accessed by a device for distributing the program.

As described above, according to the present invention, one or more conditions satisfied by a route to be distinguished from other routes from the starting pin to the end pin are set, and determination is made as to whether or not the set conditions are satisfied to search for a route from the starting pin to the end pin for each route distinguished from others by the conditions. Therefore, a route can be extracted by type of route distinguished from others by a necessary condition.

According to the present invention, one or more conditions to be satisfied among the two or more routes in selecting (grouping) one of the two or more routes having the same junction pin in the routes from the starting pin to the end pin are set, one of the two or more routes satisfying the set conditions is selected and set aside (or they are synthesized), and the routes from the starting pin to the end pin is searched for. Therefore, a route not to be set aside can be removed when a route is searched for with all routes taken into account.

In the search for a route described above, the number of extracted routes can be reduced without removing a route to be considered in the simulation (timing analysis, waveform analysis, etc.). Therefore, the simulation performed using the result of the search for a route can be performed constantly with high precision with the requirements for the memory capacity reduced and the processing time shortened. Although one of the results of the search for a route used in the simulation is utilized, the precision can be largely improved, the requirements for the memory capacity can be reduced, and the processing time can be effectively shortened.

In the invention according to claim 1, a route from a starting point pin to an end point pin is distinguished from others depending on whether or not a set condition can be satisfied when the route is searched for. If there are a plurality of routes satisfying the same condition, one of the routes represents the others. Therefore, the number of extracted routes can be reduced with necessary routes set aside. Since a route is distinguished from others by a condition satisfied, the contents of a process can be easily switched depending on the condition satisfied.

In the invention according to claims 6 and 16, the number of extracted routes can be reduced with a route whose analysis result can be the worst of all set aside without fail. Therefore, the processing time can be shortened, and the requirements for the memory capacity can be reduced without lowering the precision of an analysis result.

When a search for a route is carried out with the analysis information generated for use in a waveform analysis of a signal to be transmitted through the route, the waveform analysis can be easily and quickly performed.

As described above, the present invention is very effective in supporting the design of a electronic circuit which has been realized in a large scale, and whose routes have been more and more complicated these days.

What is claimed is:

1. A method for a search for a route of a signal from a starting point pin to an end point pin in an electronic circuit designed by combining cells which are basic elements entered for use in a designing process, comprising:
   setting one or more conditions satisfied by a route to be distinguished from other routes from the starting point pin to the end point pin; and
   distinguishing a route from others depending on whether or not the route satisfies the set condition, and carrying out a search for a route from the starting point pin to the end point pin on each route to be distinguished from others by a condition.

2. The method according to claim 1, wherein when there are a plurality of the same type of routes to be distinguished from others, one of the plurality of routes is selected and set aside according to predetermined selection rules.

3. The method according to claim 1, wherein a route can be distinguished from others based on a type of condition, a number of conditions, or a combination of conditions.

4. The method according to claim 1, wherein
   said search for a route is carried out by generating at least data indicating a pin positioned immediately before, and a route identification code for identification of a route while passing control forward pin by pin from the starting point pin; and
   a value of the route identification code is first set at least after the condition is satisfied to distinguish the route from others by the condition.

5. The method according to claim 4, wherein said route is selected according to the selection rules that the same route identification code is assigned.

6. A method for a search for a route of a signal by connecting pins from a starting point pin to an end point pin in an electronic circuit designed by combining cells which are basic devices entered for use in a designing process, comprising:
   when there are at least two routes from the starting point pin to the end point pin joining one another on the same pin, setting at least one condition to be satisfied among the at least two routes when one of the at least two routes is selected; and
   carrying out a search for a route from the starting point pin to the end point pin while selecting and setting aside only one of the at least two routes satisfying the at least one condition.

7. The method according to claim 6, wherein a route having a longest or shortest delay time is selected from the at least two routes satisfying the at least one condition.

8. The method according to claim 6, wherein said starting point pin is a clock source outputting an externally input or internally generated clock signal.

9. The method according to claim 8, wherein the at least one condition includes the clock source immediately before a joint pin matching in the at least two routes, and the same phase in transmission of a clock signal from the clock source.

10. The method according to claim 7, wherein when a path connecting the pins has the longest delay time and the shortest delay time, and the path having the longest delay time is selected from among the at least two routes satisfying the at least one condition, the at least one condition includes the relationship in which the delay time of a section, from a pin on which the at least two routes branch to the joining pin immediately after the branch pin, computed using the shortest delay time of a path in one of the at least two routes is equal to or longer than the delay time of the section computed using the longest delay time of the path of another route of the at least two routes.

11. The method according to claim 7, wherein when first and second paths connecting the pins have the longest delay time and the shortest delay time, respectively, and the second path is selected from among the at least two routes satisfying the at least one condition, the at least one condition includes the relationship in which the delay time of a section, from a pin on which the at least two routes branch to the junction pin immediately after the branch pin, computed using the longest delay time of a path in one of the at least two routes is equal to or shorter than the delay time of the section computed using the shortest delay time of the path of another route of the at least two routes.

12. The method according to claim 7, wherein when first and second paths connecting the pins have the longest delay time and the shortest delay time, respectively, and the first path is selected from among the at least two routes satisfying the at least one condition, the at least one condition includes the relationship in which the delay time of a section, from a pin on which the at least two routes branch to the junction pin immediately after the branch pin, computed using the shortest delay time of a path from the branch pin to another branch pin immediately before the junction pin in one of the at least two routes, and using the longest delay time of a path from the other branch pin to the junction pin is equal to or longer than the delay time of the section computed using the longest delay time of the path of another route of the at least two routes.

13. The method according to claim 7, wherein when first and second paths connecting the pins have the longest delay time and the shortest delay time, respectively, and the second path is selected from among the at least two routes satisfying the at least one condition, the at least one condition includes the relationship in which the delay time of a section, from a pin on which the at least two routes branch to the junction pin immediately after the branch pin, computed using the longest delay time of a path from the branch pin to another branch pin immediately before the junction pin in one of the at least two routes, and using the shortest delay time of a path from the other branch pin to the junction pin is equal to or shorter than the delay time of the section computed using the shortest delay time of the path of another route of the at least two routes.

14. The method according to claim 8, wherein
said search for a route is carried out by generating at least data indicating an immediately preceding pin positioned immediately before a current pin, and a route identification code for identification of a route while passing control forward pin by pin from the starting point pin; and
a value of the route identification code is first set at least after control is passed beyond a pin which is a clock source other than the starting point pin.

15. The method according to claim 14, wherein the at least one condition includes route identification codes matching each other.

16. A method for a search for a route of a signal from a starting point pin to an end point pin in an electronic circuit designed by combining cells which are basic devices entered for use in a designing process, comprising:
when there are at least two routes joining one another on a joint pin in routes from the starting point pin to the end point pin, setting at least one condition to be satisfied among the at least two routes when the at least two routes are synthesized; and
carrying out a search for a route from the starting point pin to the end point pin while synthesizing the at least two routes satisfying the at least one condition in one route.

17. The method according to claim 16, wherein
said search for a route is carried out by generating at least data indicating a pin positioned immediately before each pin, and analysis information for use in performing a waveform analysis on the signal while passing control forward pin by pin from the starting point pin to the end point pin; and
synthesizing the at least two routes satisfying the at least one condition is performed by mingling the analysis information respectively generated in the at least two routes.

18. The method according to claim 16, wherein when the starting point pin is a clock source outputting an externally input or internally generated clock signal, the at least one condition includes matching clock sources positioned immediately before the joint pin among the at least two routes, and the same phase of the clock signal from the clock sources.

19. The method according to claim 17, wherein said analysis information includes at least data indicating a phase in transmission of a clock signal from a clock source immediately before, and delay data for computation of a pulse width of the clock signal.

20. The method according to claim 19, wherein:
when a path connecting the pins has a longest delay time and a shortest delay time, and a phase in transmission of the clock signal is the same as a phase of the pin positioned immediately before, at least one of a delay difference of a starting point is computed by subtracting a shortest delay time from a longest delay time required to transmit the clock signal from rise to rise of the clock signal;
a delay difference of an end point is computed by subtracting a shortest delay time required to transmit the clock signal from fall to fall of the clock signal from a longest delay time required to transmit the clock signal from rise to rise of the clock signal;
a third delay difference computed by subtracting a shortest delay time required to transmit the clock signal from rise to rise of the clock signal from a longest delay time required to transmit the clock signal from fall to fall of the clock signal;
and a fourth delay difference is computed by subtracting a shortest delay time from a longest delay time required to transmit the clock signal from fall to fall of the clock signal is computed as a delay difference from the pin immediately before;
said delay data has one or more total delay differences containing one of the starting through fourth delay differences to be added; and
said delay data is generated by adding the delay difference computed using one of the starting point through fourth delay differences to a total delay difference among the delay data generated on the pin positioned immediately before.

21. The method according to claim 19, wherein:
when a path connecting the pins has a longest delay time and a shortest delay time, and a phase in transmission of the clock signal is opposite the phase of the pin positioned immediately before, at least one of a fifth delay difference computed by subtracting a shortest delay time from a longest delay time required to transmit the clock signal from fall to rise of the clock signal;
a sixth delay difference computed by subtracting a shortest delay time required to transmit the clock signal from rise to fall of the clock signal from a longest delay time required to transmit the clock signal from fall to rise of the clock signal;
a seventh delay difference computed by subtracting a shortest delay time required to transmit the clock signal from fall to rise of the clock signal from a longest delay time required to transmit the clock signal from rise to fall of the clock signal; and
an eighth delay difference computed by subtracting a shortest delay time from a longest delay time required to transmit the clock signal from rise to fall of the clock signal is computed as a delay difference from the pin immediately before;
said delay data has one or more total delay differences containing one of the fifth through eighth delay differences to be added; and
said delay data is generated by adding the delay difference computed using one of the fifth through eighth delay differences to a total delay difference among the delay data generated on the pin positioned immediately before.

22. The method according to claim 20, wherein the at least two routes satisfying the at least one condition are synthesized by selecting the largest delay difference or the shortest delay difference by type of delay difference generated as the delay data in the at least two routes.

23. The method according to claim 19, wherein when a pin positioned immediately before a pin for which the analysis information is generated is a clock source other than the starting point pin, the data indicating the phase is inphase data, and a value of the total delay difference forming the delay data is a predetermined initial value.

24. A method for a search for a route of a signal by connecting pins from a starting point pin to an end point pin in an electronic circuit designed by combining cells which are basic devices entered for use in a designing process, comprising:
    when there are at least two routes from the starting point pin to the end point pin joining one another on a junction pin, setting at least one condition to be satisfied among the at least two routes when the at least two routes are synthesized in one route;
    confirming whether or not the at least two routes satisfying the at least one condition join one another on each pin while passing control forward pin by pin from the starting point pin; and
    when it is certain by the confirming step that the at least two routes satisfying the at least one condition join one another, selecting and setting aside one of the at least two routes, and carrying out a search for a route from the starting point pin to the end point pin.

25. A storage medium storing a program executed by a route search apparatus for a search for a route of a signal from a starting point pin to an end point pin in an electronic circuit designed by combining cells which are basic devices entered for use in a designing process, comprising the functions of:
    setting at least one condition satisfied by a route to be distinguished from other routes from the starting point pin to the end point pin; and
    distinguishing a route from others depending on whether or not the route satisfies the at least one condition, and carrying out a search for a route from the starting point pin to the end point pin on each route to be distinguished from others by the at least one condition.

26. A storage medium storing a program executed by a route search apparatus for a search for a route of a signal from a starting point pin to an end point pin in an electronic circuit designed by combining cells which are basic devices entered for use in a designing process, comprising the functions of:
    when there are at feast two routes from the starting point pin to the end point pin joining one another on the same pin, setting at least one condition to be satisfied among the at least two routes when one of the at least two routes is selected; and
    carrying out a search for a route from the starting point pin to the end point pin while selecting and setting aside only one of the at least two routes satisfying the at least one condition.

27. A storage medium storing a program executed by a route search apparatus for a search for a route of a signal from a starting point pin to an end point pin in an electronic circuit designed by combining cells which are basic devices entered for use in a designing process, comprising the functions of:
    when there are at least two routes synthesizing one another on the same joint pin in routes from the starting point pin to the end point pin, setting at least one condition to be satisfied among the at least two routes when the at least two routes are synthesized; and
    carrying out a search for a route from the starting point pin to the end point pin while synthesizing at least two routes satisfying the at least one condition in one route.

28. A method for a search for a route from a starting point to an end point, comprising:
    setting at least one condition satisfied by a route to be distinguished from other routes from the starting point to the end point; and
    distinguishing a route from others depending on whether or not the route satisfies the at least one condition, and carrying out a search for a route from the starting point to the end point on each route to be distinguished from others by the at least one condition.

* * * * *

UNITED STATES PATENT AND TRADEMARK OFFICE
CERTIFICATE OF CORRECTION

PATENT NO. : 7,073,153 B2
APPLICATION NO. : 09/982840
DATED : July 4, 2006
INVENTOR(S) : Hiroshi Ikeda et al.

It is certified that error appears in the above-identified patent and that said Letters Patent is hereby corrected as shown below:

Column 36, Line 4, Change "feast" to --least--.

Signed and Sealed this

Fifth Day of December, 2006

JON W. DUDAS
*Director of the United States Patent and Trademark Office*